US010369703B2

(12) United States Patent
Miyamoto

(10) Patent No.: US 10,369,703 B2
(45) Date of Patent: Aug. 6, 2019

(54) ROBOT, CONTROL DEVICE, AND ROBOT SYSTEM

(71) Applicant: Seiko Epson Corporation, Tokyo (JP)

(72) Inventor: Yoshito Miyamoto, Shiojiri (JP)

(73) Assignee: Seiko Epson Corporation (JP)

( * ) Notice: Subject to any disclaimer, the term of this patent is extended or adjusted under 35 U.S.C. 154(b) by 78 days.

(21) Appl. No.: 15/244,106

(22) Filed: Aug. 23, 2016

(65) Prior Publication Data

US 2017/0057093 A1 Mar. 2, 2017

(30) Foreign Application Priority Data

Aug. 31, 2015 (JP) .................................. 2015-170162

(51) Int. Cl.
*B25J 13/08* (2006.01)
*B25J 9/16* (2006.01)

(52) U.S. Cl.
CPC ........... *B25J 13/089* (2013.01); *B25J 9/1694* (2013.01); *B25J 13/085* (2013.01); *G05B 2219/39056* (2013.01); *G05B 2219/39177* (2013.01); *G05B 2219/40042* (2013.01)

(58) Field of Classification Search
CPC ...... B25J 9/1697; B25J 9/1687; B25J 13/085; B25J 13/089; G05B 2219/39177; G05B 2219/39516; G05B 2219/39561; G05B 2219/40058; G05B 2219/41089; G05B 2219/49117; G05B 2219/50085; B01L 2200/025; B23Q 3/186; G01C 9/00
See application file for complete search history.

(56) References Cited

U.S. PATENT DOCUMENTS

| 5,239,855 | A | * | 8/1993 | Schleifer | B25J 9/1692 73/1.75 |
| 6,057,695 | A | * | 5/2000 | Holt | B25J 9/1694 324/756.05 |
| 2004/0037689 | A1 | * | 2/2004 | Watanabe | B25J 9/1697 414/730 |
| 2008/0312769 | A1 | * | 12/2008 | Sato | B25J 9/1633 700/249 |
| 2014/0309762 | A1 | * | 10/2014 | Hayata | B25J 9/1682 700/114 |
| 2015/0314441 | A1 | * | 11/2015 | Tsuchida | B25J 9/1633 700/260 |
| 2016/0082598 | A1 | * | 3/2016 | Anducas Aregall | B25J 19/022 382/153 |

FOREIGN PATENT DOCUMENTS

| JP | 09-258814 A | 10/1997 |
| JP | 2010-058235 A | 3/2010 |

* cited by examiner

*Primary Examiner* — Abby Y Lin
(74) *Attorney, Agent, or Firm* — Harness, Dickey & Pierce, P.L.C.

(57) ABSTRACT

A robot includes an arm. A first inclinometer is provided in a grasping unit provided in the arm or an object grasped by the grasping unit. The arm is operated based on a first angle of a reference surface and a second angle measured by the first inclinometer.

17 Claims, 14 Drawing Sheets

ROBOT, CONTROL DEVICE, AND ROBOT SYSTEM

BACKGROUND

1. Technical Field

The present invention relates to a robot, a control device, and a robot system.

2. Related Art

A technique of causing a robot to grasp an object and to perform predetermined work has been studied and developed.

In regard thereto, there is a known control method in which an arm is operated in a horizontal direction with respect to a plane perpendicular to a gravity direction by using an inclinometer (refer to JP-A-09-258814).

However, according to the control method in the related art, a flat work surface that is a surface of a workpiece on which work is performed cannot be caused to be horizontal with respect to the plane perpendicular to the gravity direction. Therefore, even though the arm can be moved horizontally with respect to the plane in the control method, in a case where the flat work surface inclines with respect to the plane, there are cases where an error occurs in work which has to be performed in a state where the flat work surface is horizontal with respect to the plane, resulting in failure of the work.

SUMMARY

An aspect of the invention is directed to a robot including an arm. A first inclinometer is provided in a grasping unit provided in the arm or an object grasped by a grasping unit. The arm is operated based on a first angle of a reference surface and a second angle measured by the first inclinometer.

According to this configuration, the robot operates the arm based on the first angle of the reference surface and the second angle measured by the first inclinometer. Accordingly, the robot can move the object through an operation performed in accordance with the reference surface and the second angle.

In another aspect of the invention, the robot may have a configuration in which the first angle is measured by the first inclinometer.

According to this configuration, the robot measures the first angle by using the first inclinometer. Accordingly, the robot can move the object through an operation performed based on the first angle and the second angle measured by the first inclinometer, and the reference surface.

In another aspect of the invention, the robot may have a configuration in which the first angle is measured by the first inclinometer in a state where a predetermined surface of the object or a predetermined surface of the grasping unit is caused to come into surface contact with the reference surface.

According to this configuration, the robot measures the first angle by using the first inclinometer in a state where the predetermined surface of the object or the predetermined surface of the grasping unit is caused to come into surface contact with the reference surface. Accordingly, the robot can move the object through an operation performed based on the first angle and the second angle measured by the first inclinometer in a state where the predetermined surface of the object or the predetermined surface of the grasping unit is caused to come into surface contact with the reference surface.

In another aspect of the invention, the robot may have a configuration in which the arm includes a force detector which detects force, and a predetermined surface of the object or a predetermined surface of the grasping unit is caused to come into surface contact with the reference surface based on an output of the force detector.

According to this configuration, the robot causes the predetermined surface of the object or the predetermined surface of the grasping unit to come into surface contact with the reference surface based on the output of the force detector. Accordingly, the robot can move the object by utilizing a state where the predetermined surface of the object or the predetermined surface of the grasping unit is caused to come into surface contact with the reference surface based on the output of the force detector.

In another aspect of the invention, the robot may have a configuration in which the first angle is measured by a second inclinometer which is different from the first inclinometer.

According to this configuration, the robot measures the first angle by using the second inclinometer which is different from the first inclinometer. Accordingly, the robot can move the object through an operation performed in accordance with the reference surface, based on the first angle measured by the second inclinometer and the second angle measured by the first inclinometer.

In another aspect of the invention, the robot may have a configuration in which at least a portion of the arm is moved horizontally with respect to the reference surface.

According to this configuration, the robot moves at least a portion of the arm horizontally with respect to the reference surface. Accordingly, the robot can move the object horizontally with respect to the reference surface.

In another aspect of the invention, the robot may have a configuration in which a processing device is provided on a surface parallel to the reference surface, and the object is a workpiece processed by the processing device.

According to this configuration, the robot operates the arm based on the first angle measured by utilizing the reference surface, and the second angle measured by the first inclinometer provided in the workpiece processed by the processing device or the grasping unit. Accordingly, the robot can move the workpiece processed by the processing device, through an operation performed in accordance with the reference surface.

In another aspect of the invention, the robot may have a configuration in which an image capturing unit is included, and a positional relationship between the grasping unit and the object is changed based on a captured image which is captured by the image capturing unit.

According to this configuration, the robot changes the positional relationship between the grasping unit and the object based on the captured image which is captured by the image capturing unit. Accordingly, even in a case where the positional relationship between the grasping unit and the object has deviated, the robot can restore the positional relationship to that before the deviation.

In another aspect of the invention, the robot may have a configuration in which the first angle is remeasured in a case where a predetermined condition is satisfied.

According to this configuration, the robot remeasures the first angle in a case where the predetermined condition is satisfied. Accordingly, the robot can remeasure the first angle in a case where there is a high possibility that the first angle has deviated.

In another aspect of the invention, the robot may have a configuration in which deviations of a predetermined surface of the object or a predetermined surface of the grasping unit and a predetermined surface of the first inclinometer from a referential positional relationship are corrected.

According to this configuration, the robot corrects the deviations of the predetermined surface of the object or the predetermined surface of the grasping unit and the predetermined surface of the first inclinometer from the referential positional relationship. Accordingly, the robot can move the object through an operation performed in accordance with the reference surface, based on the corrected positional relationship.

Still another aspect of the invention is directed to a control device which controls the robot according to any one of the above-described aspects so as to perform an operation of the robot.

According to this configuration, the control device operates the arm based on the first angle measured by utilizing the reference surface and the second angle measured by the first inclinometer. Accordingly, the control device can move the object through an operation performed in accordance with the reference surface.

Yet another aspect of the invention is directed to a robot system including the robot according to any one of the above-described aspects, and the above-described control device.

According to this configuration, the robot system operates the arm based on the first angle measured by utilizing the reference surface and the second angle measured by the first inclinometer. Accordingly, the robot system can move the object through an operation performed in accordance with the reference surface.

As described above, the robot, the control device, and the robot system operate the arm based on the first angle measured by utilizing the reference surface and the second angle measured by the first inclinometer. Accordingly, the robot, the control device, and the robot system can move the object through an operation performed in accordance with the reference surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Figure 1:
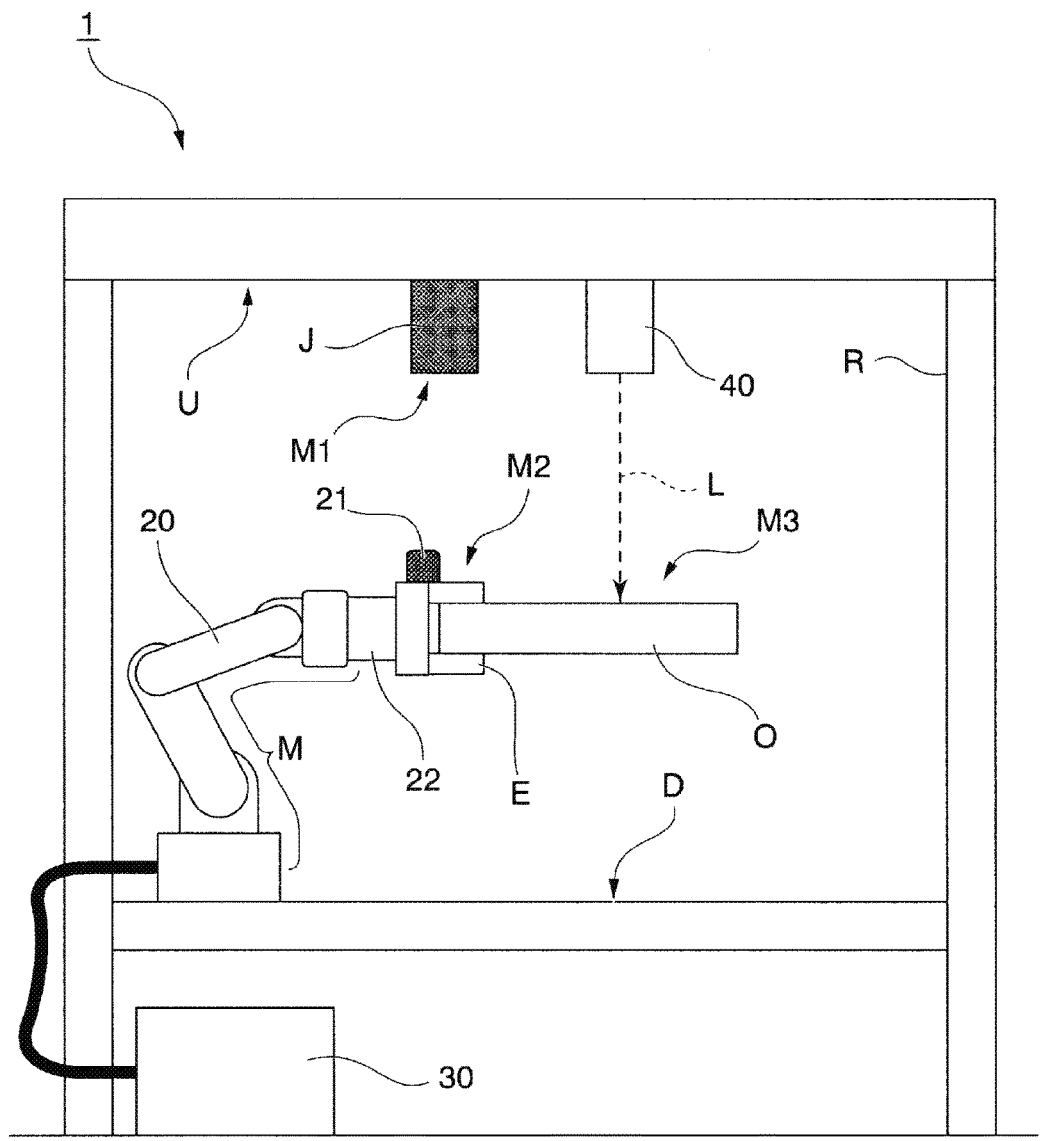
FIG. 1 is a configuration diagram illustrating an example of a robot system of the present embodiment.

Hereinafter, an embodiment of the invention will be described with reference to the drawings. FIG. 1 is a configuration diagram illustrating an example of a robot system 1 of the present embodiment. The robot system 1 includes a robot 20 and a control device 30.

First, a configuration of the robot 20 included in the robot system 1 will be described.

The robot 20 is a single arm robot. The single arm robot is a robot including one arm. In place of the single arm robot, the robot 20 may be a multiple arm robot. The multiple arm robot is a robot including two or more arms. A double arm robot including two arms as illustrated in FIG. 1 is an example of the multiple arm robot.

The arm includes an end effector E, a manipulator M, a first inclination measuring unit 21, and a force detection unit 22.

The end effector E includes two or more claw portions which can grasp an object, the first inclination measuring unit 21, and a plurality of actuators (not illustrated). Each of the plurality of actuators included in the end effector E is connected to the control device 30 through a cable so as to be able to communicate therewith. Accordingly, the actuators respectively operate the two or more claw portions based on a control signal acquired from the control device 30. Cable communication via the cable is performed based on a standard of the Ethernet (registered trademark) or a universal serial bus (USB), for example. The actuators may be configured to be connected to the control device 30 through radio communication performed based on a communication standard of the Wi-Fi (registered trademark) or the like.

The end effector E may be configured to be attachable/detachable with respect to the manipulator M. In place of the configuration including the two or more claw portions which can grasp an object, the end effector E may be configured to include an adsorption portion which can adsorb an object by using air or magnetism. The end effector E is an example of a grasping unit.

The first inclination measuring unit 21 is included on a hand surface M2 which is a surface provided in a portion of the end effector E. The hand surface M2 is an example of a predetermined surface of the grasping unit. The first inclination measuring unit 21 is a sensor which measures an inclination of the hand surface M2 with respect to an XY plane in a robot coordinate system. In place of the configuration of measuring an angle indicating the inclination of the hand surface M2 with respect to the XY plane, the first inclination measuring unit 21 may be configured to measure an angle indicating the inclination of the hand surface M2 with respect to a different surface.

In this example, the inclination of the hand surface M2 is expressed by an angle indicating an inclination between an X-axis direction in the XY plane and an X-axis direction in a three-dimensional local coordinate system set on the hand surface, and an angle indicating an inclination between a Y-axis direction in the XY plane and a Y-axis direction in the three-dimensional local coordinate system set on the hand surface M2. The inclination of the hand surface M2 may be configured to be expressed by a different value.

The first inclination measuring unit 21 outputs inclination information including the measured angles thereof as output values to the control device 30 through communication. One or more angles indicating the inclination of the hand surface M2 included in the inclination information are examples of a second angle. The first inclination measuring unit 21 is connected to the control device 30 through a cable so as to be able to communicate therewith. Cable communication via the cable is performed based on a standard of the Ethernet (registered trademark) or a USB, for example. The first inclination measuring unit 21 may be configured to be connected to the control device 30 through radio communication performed based on a communication standard of the Wi-Fi (registered trademark) or the like. The first inclination measuring unit 21 is an example of a first inclinometer.

The manipulator M is a seven-axis vertical multiple joint-type manipulator including seven joints and a plurality of actuators (not illustrated). Therefore, the arm operates with the degree of freedom of seven axes through an operation in which a support table, the end effector E, and the manipulator M are caused to associate with each other by the actuators. The arm may be configured to operate with the degree of freedom of six axes or less or may be configured to operate with the degree of freedom of eight axes or more.

In a case where the arm operates with the degree of freedom of seven axes, the arm can have more postures compared to a case of operating with the degree of freedom of six axes or less. Accordingly, for example, the arm can smoothly operate. Moreover, the arm can easily avoid interference with an object present in the surroundings of the arm. In a case where the arm operates with the degree of freedom of seven axes, the arm has a less calculation amount compared to a case where the arm operates with the degree of freedom of eight axes or more, thereby being easily controlled.

Each of the plurality of actuators included in the manipulator M is connected to the control device 30 through a cable so as to be able to communicate therewith. Accordingly, the actuators operate the manipulator M based on a control signal acquired from the control device 30. Cable communication via the cable is performed based on a standard of the Ethernet (registered trademark) or a USB, for example. A portion or all of the actuators may be configured to be connected to the control device 30 through radio communication performed based on a communication standard of the Wi-Fi (registered trademark) or the like.

The force detection unit 22 is included between the end effector E and the manipulator M. The force detection unit 22 detects a value indicating the magnitude of force or moment acting on the end effector E or an object grasped by the end effector E. The force detection unit 22 outputs force detection information including a value indicating the magnitude of detected force or moment as an output value to the control device 30 through communication. The force detection information is used in controlling performed by the control device 30 based on the force detection information of the arm. For example, the controlling performed based on the force detection information denotes compliance control such as impedance control. The force detection unit 22 may be a different sensor such as a torque sensor which detects a value indicating the magnitude of force or moment added to the end effector E or an object grasped by the end effector E.

The force detection unit 22 is connected to the control device 30 through a cable so as to be able to communicate therewith. Cable communication via the cable is performed based on a standard of the Ethernet (registered trademark) or a USB, for example. The force detection unit 22 may be configured to be connected to the control device 30 through radio communication performed based on a communication standard of the Wi-Fi (registered trademark) or the like.

In this example, the above-described functional units included in the robot 20 acquire a control signal from the control device 30 which is installed outside the robot 20. The functional units operate based on the acquired control signal. In place of the configuration of being controlled by the control device 30 which is installed outside, the robot 20 may be configured to be controlled by the control device 30 which is built in the robot 20.

Figure 2:
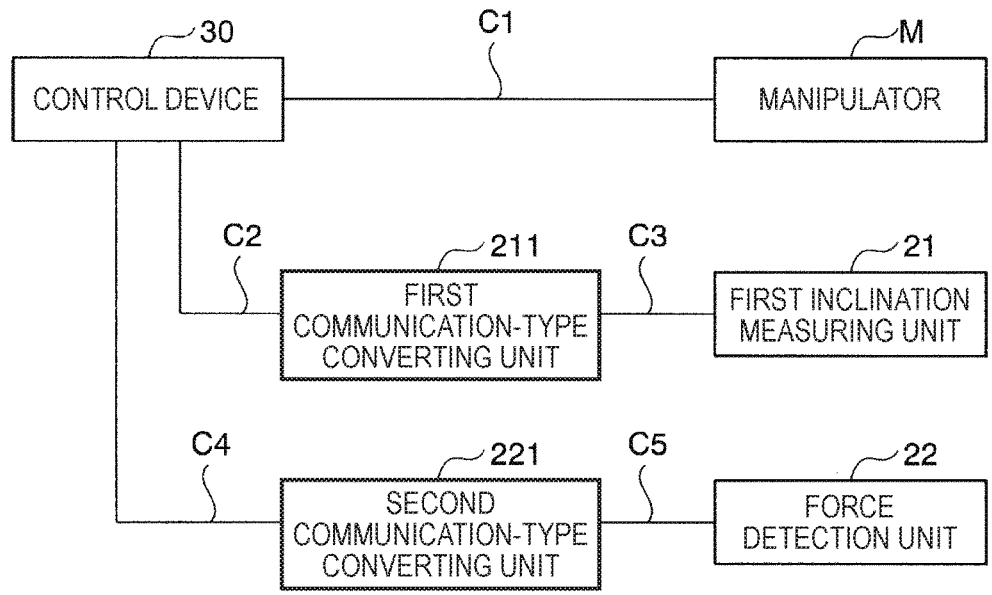
FIG. 2 is a diagram illustrating an example of a schematic configuration in which each of a manipulator, a first inclination measuring unit, and a force detection unit is connected to a control device.

The control device 30 operates the robot 20 by transmitting a control signal to the robot 20. Accordingly, the control device 30 causes the robot 20 to perform predetermined work. Here, with reference to FIG. 2, a schematic configuration in which each of the manipulator M, the first inclination measuring unit 21, and the force detection unit 22 is connected to the control device 30 will be described. FIG. 2 is a diagram illustrating an example of a schematic configuration in which each of the manipulator M, the first inclination measuring unit 21, and the force detection unit 22 is connected to the control device 30.

As illustrated in FIG. 2, the control device 30 is connected to the manipulator M via a cable C1. The control device 30 transmits a control signal to the manipulator M via the cable C1.

The control device 30 is connected to a first communication-type converting unit 211 via a cable C2. The cable C2 is a cable for performing communication complying with the RS232 communication standard, for example. In place thereof, the cable C2 may be a cable for performing communication complying with a different communication standard. The control device 30 performs communication with the first communication-type converting unit 211 via the cable C2, that is, based on the RS232 communication standard.

Meanwhile, the first communication-type converting unit 211 is connected to the first inclination measuring unit 21 via a cable C3. The cable C3 is a cable for performing communication complying with the universal asynchronous receiver-transmitter (UART) communication standard, for example. In place thereof, the cable C3 may be a cable for performing communication complying with a different communication standard. The first communication-type converting unit 211 performs communication with the first inclination measuring unit 21 via the cable C3, that is, based on the UART communication standard.

The first communication-type converting unit 211 converts information transmitted from the control device 30 to the first inclination measuring unit 21 via the cable C2, that is, information generated based on the RS232 communication standard into information which is based on the UART communication standard. The first communication-type converting unit 211 transmits the converted information to the first inclination measuring unit 21 via the cable C3. The first communication-type converting unit 211 converts information which is transmitted from the first inclination measuring unit 21 to the control device 30 via the cable C3 and is generated based on the UART communication standard into the information which is based on the RS232 communication standard. The first communication-type converting unit 211 transmits the converted information to the control device 30 via the cable C2.

The control device 30 is connected to a second communication-type converting unit 221 via a cable C4. The cable C4 is a cable for performing communication complying with the Ethernet (registered trademark) communication standard, for example. In place thereof, the cable C4 may be a cable for performing communication complying with a different communication standard. The control device 30 performs communication with the second communication-type converting unit 221 via the cable C4, that is, based on the Ethernet (registered trademark) communication standard.

Meanwhile, the second communication-type converting unit 221 is connected to the force detection unit 22 via a cable C5. The cable C5 is a cable for performing communication complying with the RS422 communication standard, for example. In place thereof, the cable C5 may be a cable for performing communication complying with a different communication standard. The second communication-type converting unit 221 performs communication with the force detection unit 22 via the cable C5, that is, based on the RS422 communication standard.

The second communication-type converting unit 221 converts information transmitted from the control device 30 to the force detection unit 22 via the cable C4, that is, information generated based on the Ethernet (registered trademark) communication standard into information which is based on the RS422 communication standard. The second communication-type converting unit 221 transmits the converted information to the force detection unit 22 via the cable C5. The second communication-type converting unit 221 converts information which is transmitted from the force detection unit 22 to the control device 30 via the cable C5 and is generated based on the RS422 communication standard into the information which is based on the Ethernet (registered trademark) communication standard. The second communication-type converting unit 221 transmits the converted information to the control device 30 via the cable C4.

As described above, the control device 30 performs communication with each of the manipulator M, the first inclination measuring unit 21, and the force detection unit 22, thereby controlling each of the manipulator M, the first inclination measuring unit 21, and the force detection unit 22.

Hereinafter, predetermined work performed by the robot 20 will be described.

For example, the robot 20 is installed on a floor surface D of a processing chamber R as illustrated in FIG. 1. The processing chamber R is a room in which the robot 20 can perform processing of an object O. In the processing chamber R, the robot 20 performs work of a material supplying step in which the object O is grasped from a material supplying region (not illustrated).

In at least a portion of the front surface, the object O has a work surface M3 that is a surface on which processing is performed. For example, the object O is an industrial workpiece, an industrial component, or an industrial member having the work surface M3, such as a plate assembled in a product. In this example, description will be given regarding a case where the object O is a rectangular parallelepiped member having the work surface M3 as illustrated in FIG. 1. When grasping the object O from the material supplying region (not illustrated), the robot 20 grasps the object O so as to cause the work surface M3 to face a ceiling surface U side. In place of an industrial component or an industrial member, the object O may be an industrial product having a flat surface (for example, the work surface M3) in at least a portion of the shape thereof or may be a different object such as goods for daily use and a living body having a flat surface (for example, the work surface M3) in at least a portion of the shape thereof. In place of the rectangular parallelepiped shape, the object O may a different shape.

The ceiling surface U of the processing chamber R is provided with a jig J having a reference surface M1, and a processing device 40. The jig J is installed on the ceiling surface U so as to cause a surface on a side opposite to the reference surface M1 to come into surface contact with the ceiling surface U. Accordingly, the reference surface M1 faces the floor surface D side. The reference surface M1 is provided in the jig J so as to be horizontal with respect to the ceiling surface U. The reference surface M1 is not limited to being horizontal with respect to the XY plane in the robot coordinate system. In this example, the inclination of the reference surface M1 with respect to the XY plane is expressed by an angle indicating an inclination between the X-axis direction in the XY plane and the X-axis direction in the three-dimensional local coordinate system set on the reference surface M1, and an angle indicating an inclination between the Y-axis direction in the XY plane and the Y-axis direction in the three-dimensional local coordinate system set on the reference surface M1. The inclination of the reference surface M1 may be configured to be expressed by a different value. The angle indicating the inclination of the reference surface M1 with respect to the XY plane in the robot coordinate system is an example of a first angle.

In this example, the processing device 40 is a laser processing device. The processing device 40 emits a laser L with which surface processing can be performed by melting the work surface M3 of the object O, in a direction orthogonal to the ceiling surface U, that is, a direction oriented toward the floor surface D from the ceiling surface U. For example, the processing device 40 is connected to the control device 30 through a cable so as to be able to communicate therewith. Accordingly, the processing device 40 emits the laser L based on a control signal acquired from the control device 30.

Cable communication via the cable is performed based on a standard of the Ethernet (registered trademark) or a USB, for example. The processing device 40 may be configured to be connected to the control device 30 through radio communication performed based on a communication standard of the Wi-Fi (registered trademark) or the like. In place of the configuration of being controlled by the control device 30, the processing device 40 may be configured to be controlled by a different device, or may have a different configuration such as a configuration in which the laser L is emitted for only a predetermined emission time when the object O is detected by the sensor included in the processing device 40.

After grasping the object O from the material supplying region (not illustrated), the robot 20 performs work of an inclination adjustment step. The inclination adjustment step is a step in which the robot 20 causes the work surface M3 to come into surface contact with the reference surface M1 such that the work surface M3 becomes horizontal with respect to the reference surface M1. Accordingly, the robot 20 can cause the work surface M3 to be horizontal with respect to the reference surface M1. In place thereof, the inclination adjustment step may be a step in which the robot 20 causes the hand surface M2 to come into surface contact with the reference surface M1 such that the hand surface M2 becomes horizontal with respect to the reference surface M1. In this case, the robot 20 can cause the work surface M3 to be horizontal with respect to the reference surface M1.

The robot 20 moves the object O grasped by the end effector E to a predetermined processing position while maintaining a state where the work surface M3 is horizontal with respect to the reference surface M1. After the work surface M3 is processed with the laser L from the processing device 40, the robot 20 performs work of a material removing step in which the object O is removed to a material removing region (not illustrated).

As described above, the robot 20 performs a series of work from the material supplying step to the material removing step, as predetermined work.

Hereinafter, description will be given regarding an overview of processing in which the control device 30 causes the robot 20 to perform work of moving the object O to a predetermined processing position while maintaining a state where the work surface M3 is horizontal with respect to the reference surface M1, among the above-described types of predetermined work.

The control device 30 operates the arm based on the first angle of the reference surface M1 (in this example, the angle indicating the inclination of the reference surface M1 with respect to the XY plane in the robot coordinate system) and the second angle measured by the first inclination measuring unit 21 (in this example, the angle indicating the inclination of the hand surface M2 with respect to the XY plane in the robot coordinate system). Accordingly, the control device 30 can cause the robot 20 to move the object O through an operation performed in accordance with the reference surface M1. In this example, the control device 30 can move the object O in a horizontal direction with respect to the reference surface M1.

Here, description will be given in detail regarding the processing in which the control device 30 causes the robot 20 to perform work of moving the object O to a predetermined processing position while maintaining a state where the work surface M3 is horizontal with respect to the reference surface M1. As described above, the control device 30 moves the end effector E which is grasping the object O and causes the work surface M3 to come into surface contact with the reference surface M1 such that the work surface M3 becomes horizontal with respect to the reference surface M1. Hereinafter, as an example, description will be given regarding a case where when the control device 30 causes the end effector E to grasp the object O, the object O is grasped such that the hand surface M2 and the work surface M3 become horizontal with respect to each other. In other words, in a case where the work surface M3 is caused to come into surface contact with the reference surface M1 such that the work surface M3 becomes horizontal with respect to the reference surface M1, the control device 30 can cause both the hand surface M2 and the work surface M3 to become horizontal with respect to the reference surface M1.

While maintaining a state where the work surface M3 is caused to come into surface contact with the reference surface M1 such that the work surface M3 becomes horizontal with respect to the reference surface M1, the control device acquires the inclination information from the first inclination measuring unit 21. The control device 30 calculates an angle of the work surface M3 with respect to the XY plane based on a relative angle between an angle indicated in the inclination information and the angle indicating the inclination of the reference surface M1 with respect to the XY plane in the robot coordinate system. The control device 30 adjusts the posture of the end effector E such that the calculated angle becomes zero in a case where the work surface M3 is intended to be horizontal with respect to the reference surface M1. In this example, the work surface M3 is caused to come into surface contact with the reference surface M1 such that the work surface M3 becomes horizontal with respect to the reference surface M1. Therefore, the angle is zero in the stage where the reference surface M1 and the work surface M3 come into surface contact with each other. In a case where the work surface M3 is intended to incline with respect to the reference surface M1 at a predetermined inclination, the control device 30 adjusts the posture of the end effector E such that the angle becomes an angle indicating a predetermined inclination.

After the posture of the end effector E is adjusted, the control device 30 moves the end effector E such that the angle indicated in the inclination information acquired from the first inclination measuring unit 21 does not change, thereby moving the object O to a predetermined processing position. Accordingly, the control device 30 can cause the robot 20 to move the object O through an operation performed in accordance with the reference surface M1. In this example, the control device 30 can move the object O in the horizontal direction with respect to the reference surface M1.

In the present embodiment, description will be given in detail regarding the processing in which the control device 30 causes the robot 20 to perform work of moving the object O to a predetermined processing position while the control device 30 maintains a state where the work surface M3 is horizontal with respect to the reference surface M1.

Figure 3:
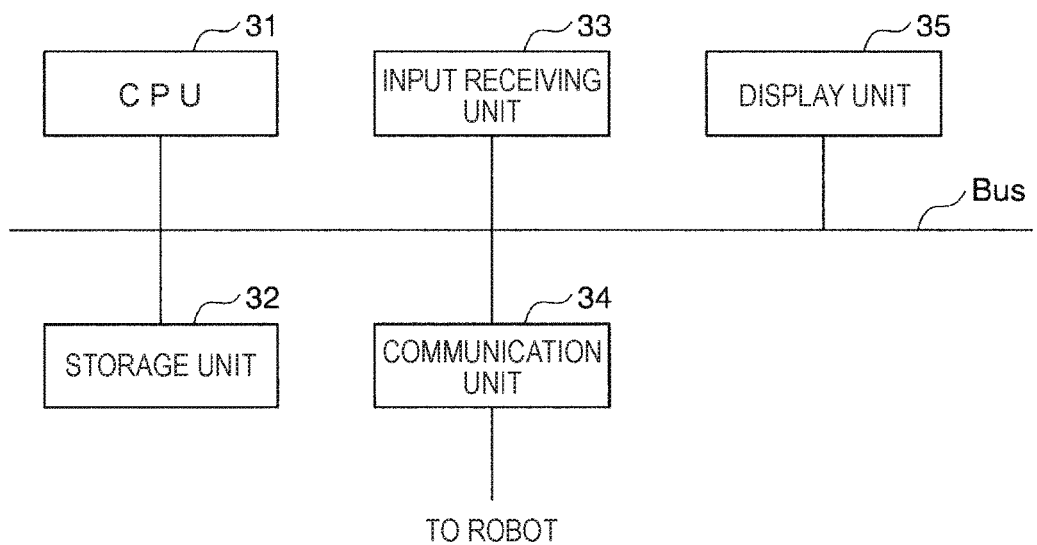
FIG. 3 is a diagram illustrating an example of a hardware configuration of the control device.

Subsequently, with reference to FIG. 3, a hardware configuration of the control device 30 will be described. FIG. 3 is a diagram illustrating an example of a hardware configuration of the control device 30. For example, the control device 30 includes a central processing unit (CPU) 31, a storage unit 32, an input receiving unit 33, a communication unit 34, and a display unit 35. The control device 30 performs communication with the robot 20 via the communication unit 34. The configurational elements are connected to each other via a bus Bus so as to be able to communicate with each other.

The CPU 31 executes various types of programs stored in the storage unit 32.

For example, the storage unit 32 includes a hard disk drive (HDD), a solid state drive (SSD), an electrically erasable programmable read-only memory (EEPROM), a read-only memory (ROM), a random access memory (RAM), and the like. In place of the storage unit which is built in the control device 30, the storage unit 32 may be an external storage device which is connected through a digital input/output port or the like for a USB or the like.

The storage unit 32 stores various types of information processed by the control device 30, images, programs, various types of positional information, and the like. In this example, the various types of positional information includes at least object positional information indicating a position of each of one or more objects O disposed in the material supplying region (not illustrated) in the robot coordinate system, reference surface positional information indicating a position of the reference surface M1, material removing region positional information indicating a position of the material removing region (not illustrated) in which the object O after being processed with the laser L is removed, and processing positional information indicating a predetermined processing position. Hereinafter, as an example, description will be given regarding a case where the various types of positional information are stored in the storage unit 32 in advance. The storage unit 32 may be configured to store the various types of positional information based on a manipulation received from a user.

For example, the input receiving unit 33 is a teaching pendant including a keyboard, a mouse, a touch pad, and the like, or a different input device. The input receiving unit 33 may be configured to be integrated with the display unit 35 as a touch panel.

For example, the communication unit 34 is configured to include a digital input/output port for a USB or the like, a port for the Ethernet (registered trademark), or the like.

For example, the display unit 35 is a liquid crystal display panel or an organic electro luminescence (EL) display panel.

Figure 4:
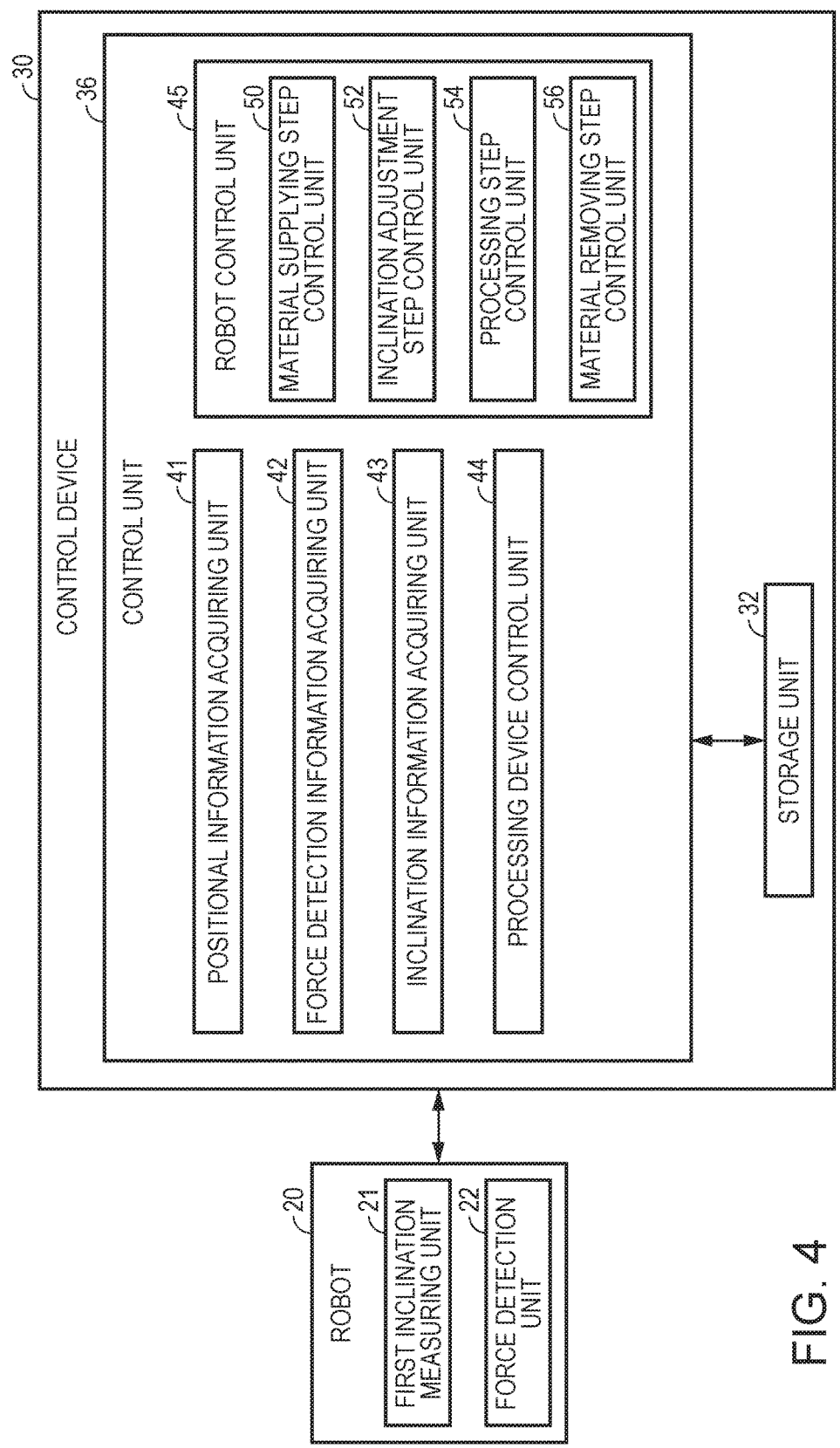
FIG. 4 is a diagram illustrating an example of a functional configuration of the control device.

Subsequently, with reference to FIG. 4, a functional configuration of the control device 30 will be described. FIG. 4 is a diagram illustrating an example of a functional configuration of the control device 30. The control device 30 includes the storage unit 32 and a control unit 36.

The control unit 36 controls the control device 30 in its entirety. The control unit 36 includes a positional information acquiring unit 41, a force detection information acquiring unit 42, an inclination information acquiring unit 43, a processing device control unit 44, and a robot control unit 45. For example, the functional units included in the control unit 36 are realized when the CPU 31 executes the various types of programs stored in the storage unit 32. A portion or all of the functional units may be a hardware functional unit such as a large scale Integration (LSI) and an application specific integrated circuit (ASIC).

The positional information acquiring unit 41 reads out the various types of positional information from the storage unit 32.

The force detection information acquiring unit 42 acquires the force detection information from the force detection unit 22.

The inclination information acquiring unit 43 acquires the inclination information from the first inclination measuring unit 21.

The processing device control unit 44 controls the processing device 40. In this example, after the object O grasped by the end effector E moves to a predetermined processing position, the processing device control unit 44 emits the laser L for only a predetermined emission time.

The robot control unit 45 includes a material supplying step control unit 50, an inclination adjustment step control unit 52, a processing step control unit 54, and a material removing step control unit 56.

The material supplying step control unit 50 causes the robot 20 to perform the work of the material supplying step.

The inclination adjustment step control unit 52 causes the robot 20 to perform the work of the inclination adjustment step.

The processing step control unit 54 causes the robot 20 to perform work of a processing step.

The material removing step control unit 56 causes the robot 20 to perform the work of the material removing step.

Figure 5:
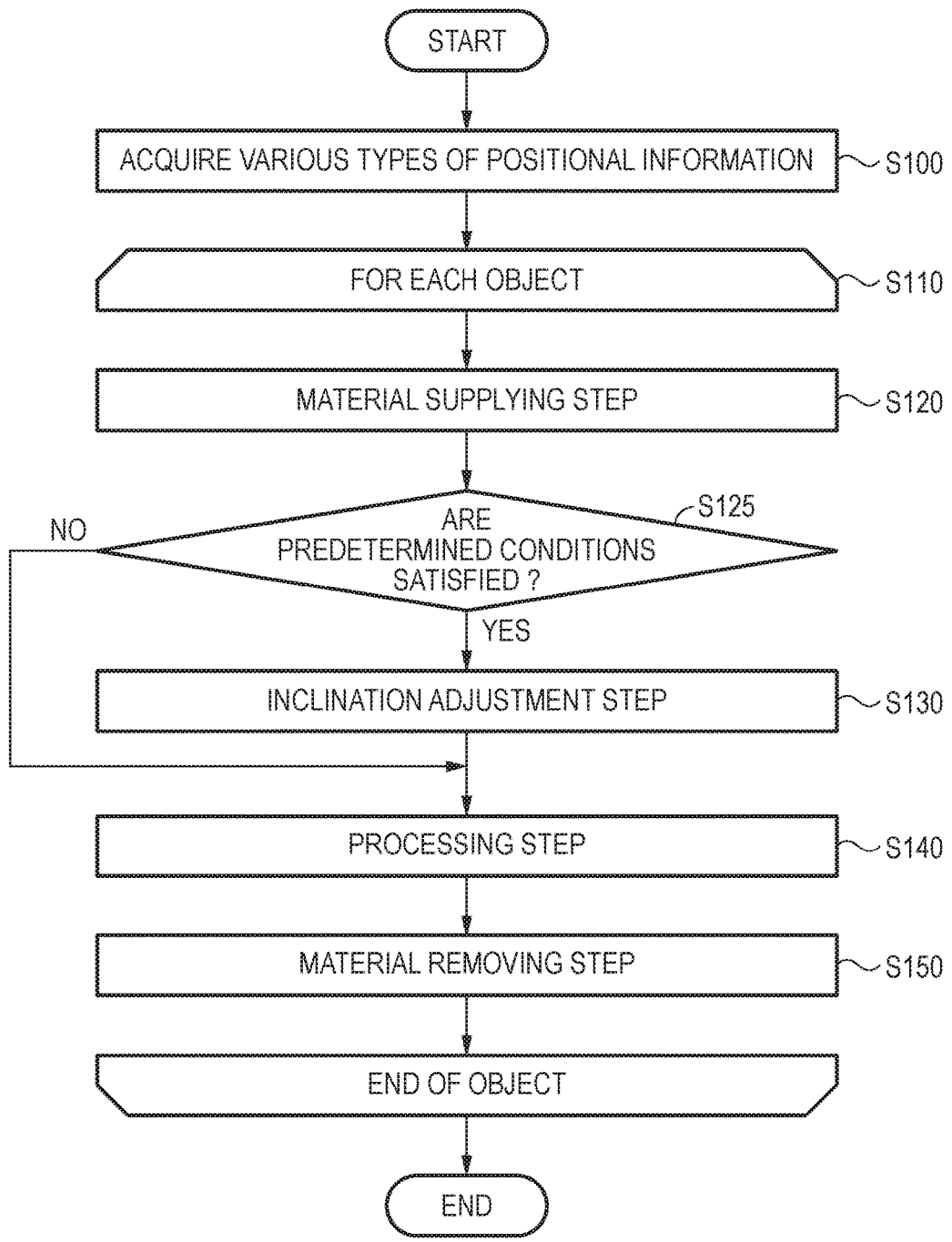
FIG. 5 is a flow chart illustrating an example of a flow of a process performed by a control unit.

Hereinafter, with reference to FIG. 5, processing performed by the control unit 36 will be described. FIG. 5 is a flow chart illustrating an example of a flow of a process performed by the control unit 36.

The positional information acquiring unit 41 acquires the various types of positional information from the storage unit 32 (Step S100). Subsequently, the robot control unit 45 selects the position one by one from one or more positions indicated in the object positional information included in the various types of positional information acquired in Step S100. The robot control unit 45 repeats the processing from Steps S120 to S150 for each object O disposed at the selected position (Step S110).

The material supplying step control unit 50 causes the robot 20 to perform the work of the material supplying step (Step S120). More specifically, the material supplying step control unit 50 grasps (material supplying) the object O disposed at the position selected in Step S110. Subsequently, the inclination adjustment step control unit 52 determines whether or not predetermined conditions are satisfied (Step S125). Predetermined conditions include three conditions described below.

Condition 1: The work of the inclination adjustment step to be performed in Step S130 has never been performed.

Condition 2: A predetermined time period has elapsed.

Condition 3: Processing from Steps S120 to S150 has been performed a predetermined number of times or more.

For example, a predetermined time period is five minutes. In place thereof, a predetermined time period may be a different time period. For example, a predetermined number of times is five times. In place thereof, a predetermined number of times may be a different number of times. Predetermined conditions may be configured to include only the conditions 1 and 2 among the above-described conditions, may be configured to include only the conditions 1 and 3 among the above-described conditions or may be configured to include other conditions in addition to the above-described conditions 1 to 3. In Step S125, in a case where at least one among the above-described conditions 1 to 3 is satisfied, the inclination adjustment step control unit 52 determines that predetermined conditions are satisfied.

In a case where predetermined conditions are determined to be satisfied (Yes in Step S125), the inclination adjustment step control unit 52 causes the robot 20 to perform the work of the inclination adjustment step (Step S130). Meanwhile, in a case where the inclination adjustment step control unit 52 determines that predetermined conditions are not satisfied (No in Step S125), the processing step control unit 54 causes the robot 20 to perform the work of the processing step (Step S140).

Here, processing in Step S130 and Step S140 will be described. First, with reference to FIGS. 6 to 8, processing in Step S130 will be described.

Figure 6:
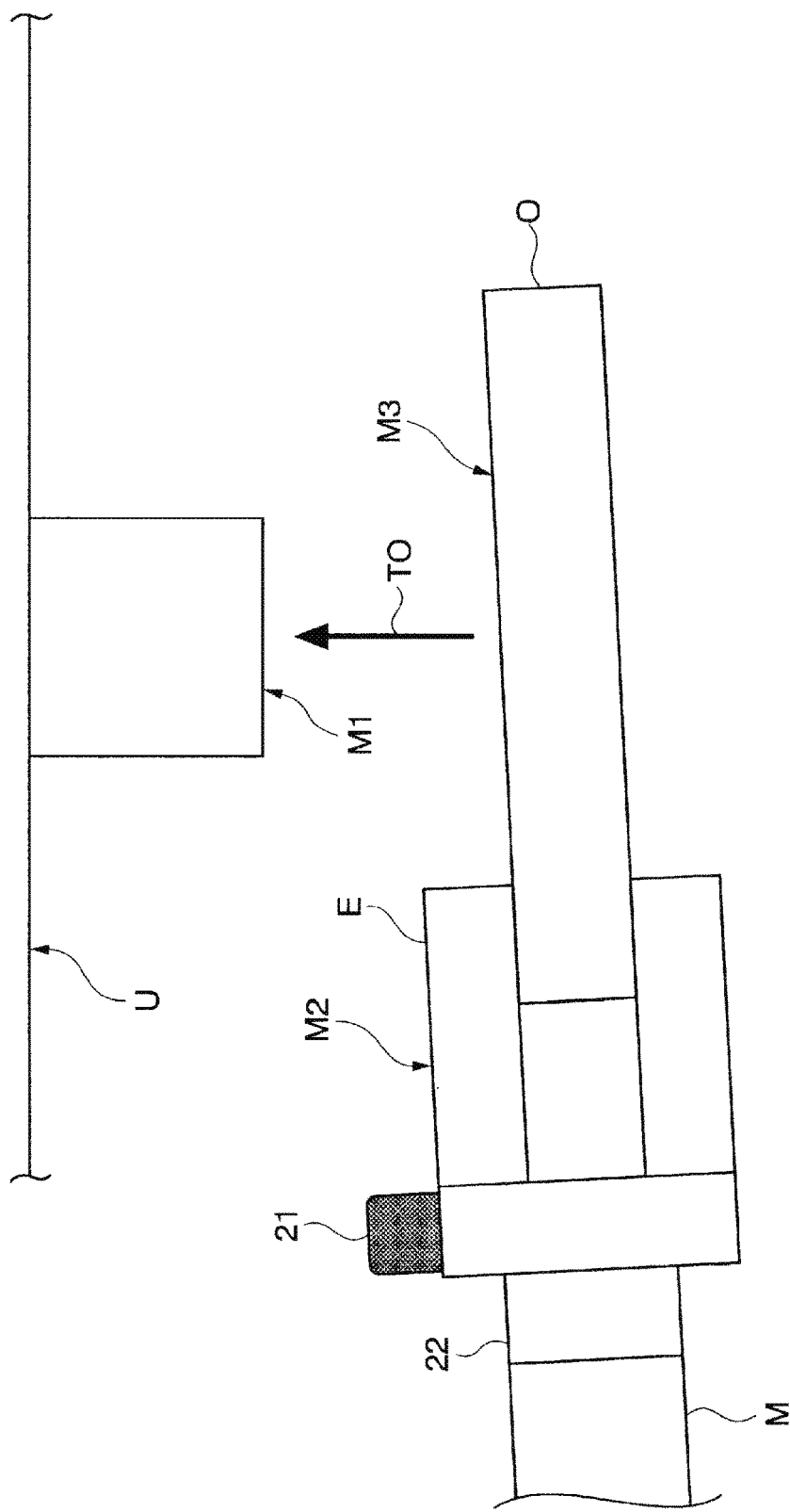
FIG. 6 is a diagram illustrating an example of a state while a robot is in the midst of causing an object grasped by an end effector to come into surface contact with a reference surface.

The inclination adjustment step control unit 52 causes the work surface M3 of the object O grasped by the end effector E to come into surface contact with the reference surface M1 through the work of the inclination adjustment step based on the reference surface positional information included in the various types of positional information read out from the storage unit 32 in Step S100. FIG. 6 is a diagram illustrating an example of a state while the robot 20 is in the midst of causing the object O grasped by the end effector E to come into surface contact with the reference surface M1. In this example, the position indicated in the reference surface positional information is the center position on the reference surface M1. The position indicated in the reference surface positional information may be a different position on the reference surface M1 such as a position of one corner among four corners of the reference surface M1. In this example, the position of the object O is indicated by the center position of the gravity of the object O.

As illustrated in FIG. 6, the inclination adjustment step control unit 52 moves the end effector E, thereby moving the position of the object O grasped by the end effector E to a position separated from the reference surface M1 by a predetermined distance in a Z-axis direction in the robot coordinate system, that is, the gravity direction. The inclination adjustment step control unit 52 moves the end effector E, thereby moving the object O in a direction of the arrow TO illustrated in FIG. 6, that is, a direction opposite to the gravity direction and causing the object O to approach the reference surface M1. The inclination adjustment step control unit 52 causes the work surface M3 of the object O to come into surface contact with the reference surface M1 such that the work surface M3 thereof becomes horizontal with respect to the reference surface M1 as illustrated in FIG. 7, through the controlling performed based on the force detection information acquired by the force detection information acquiring unit 42.

Figure 7:
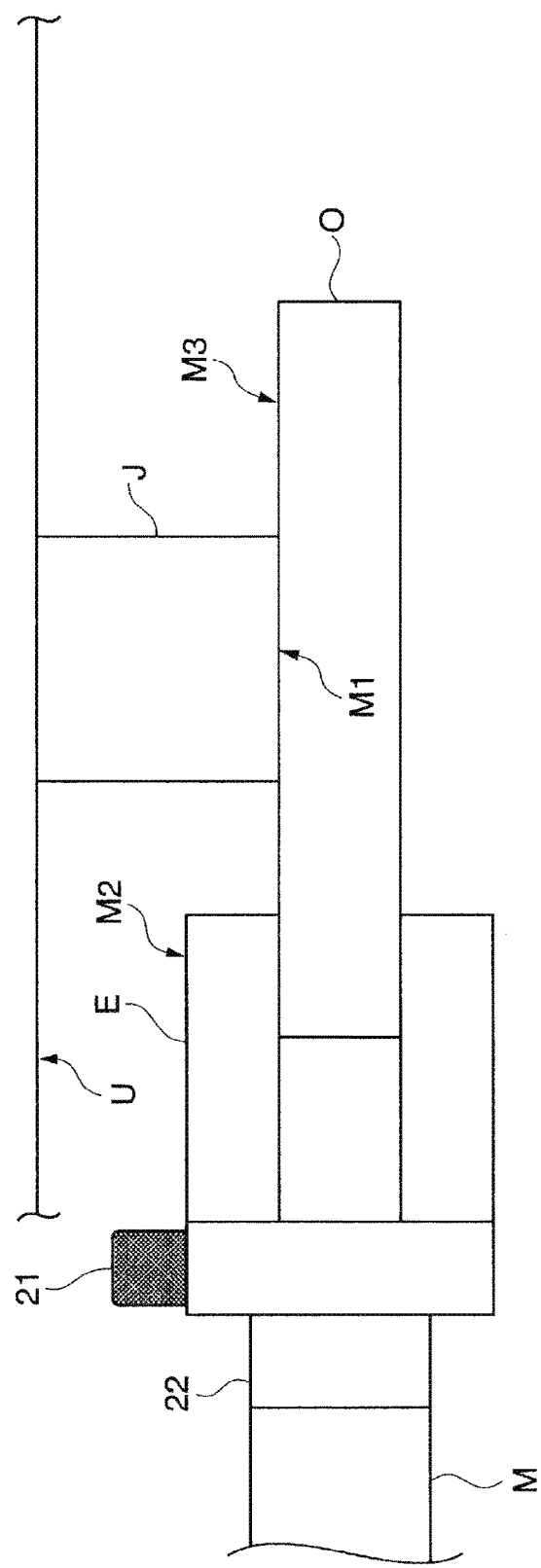
FIG. 7 is a diagram illustrating an example of a state immediately after the robot has caused the object grasped by the end effector to come into surface contact with the reference surface.

FIG. 7 is a diagram illustrating an example of a state immediately after the robot 20 has caused the object O grasped by the end effector E to come into surface contact with the reference surface M1. Here, in a case where the work surface M3 of the object O is caused to come into surface contact with the reference surface M1 such that the work surface M3 thereof becomes horizontal with respect to the reference surface M1, the inclination adjustment step control unit 52 can cause the work surface M3 of the object O to come into surface contact with the reference surface M1 such that the work surface M3 thereof becomes horizontal with respect to the reference surface M1 based on information indicating three types of force and information indicating three types of moment included in the force detection information in a case where the force detection unit 22 is adjusted in advance by software or hardware such that an output value of the force detection unit 22 included in the force detection information acquired from the force detection unit 22 becomes a value satisfying predetermined surface contact conditions. Therefore, in this example, such an adjustment is performed in advance in the force detection unit 22.

The three types of force are force in the X-axis direction, force in the Y-axis direction, and force in the Z-axis direction among the types of force added to the end effector E or the object O grasped by the end effector E. The three types of moment are rotational moment for rotating the end effector E about the X-axis, rotational moment for rotating the end effector E about the Y-axis, and rotational moment for rotating the end effector E about the Z-axis among the types of rotational moment for rotating the end effector E due to the force added to the end effector E or the object O grasped by the end effector E.

While changing the posture of the end effector E such that each of the values of the three types of force and each of the values of the three types of moment satisfy predetermined surface contact conditions described above, the inclination adjustment step control unit 52 causes the work surface M3 of the object O to come into surface contact with the reference surface M1. For example, predetermined surface contact conditions include two conditions described below.

Condition 4: The force in the Z-axis direction is force equal to or greater than a predetermined value, and the force in the X-axis direction and the force in the Y-axis direction are zero.

Condition 5: All the types of the rotational moment about the X-axis, about the Y-axis, and about the Z-axis are zero.

In place of any one or both of the above-described conditions 4 and 5, predetermined surface contact conditions may be configured to include a different condition or may be configured to include a different condition in addition to the above-described conditions 4 and 5. In this example, in a case where both the above-described conditions 4 and 5 are satisfied, the inclination adjustment step control unit 52 determines that predetermined surface contact conditions are satisfied.

In a case where the information indicating the three types of force and the information indicating the three types of moment included in the force detection information acquired by the force detection information acquiring unit 42 satisfy the predetermined surface contact conditions, the inclination adjustment step control unit 52 determines that the work surface M3 of the object O is caused to come into surface contact with the reference surface M1 such that the work surface M3 thereof becomes horizontal with respect to the reference surface M1. After the work surface M3 of the object O is caused to come into surface contact with the reference surface M1 such that the work surface M3 thereof becomes horizontal with respect to the reference surface M1, the inclination adjustment step control unit 52 causes the inclination information acquiring unit 43 to acquire the inclination information from the first inclination measuring unit 21. As that in this example, acquiring of the inclination information from the first inclination measuring unit 21 in the inclination adjustment step is an example of measuring the first angle by using the first inclinometer as well as an example of measuring the second angle by using the first inclinometer.

Figure 8:
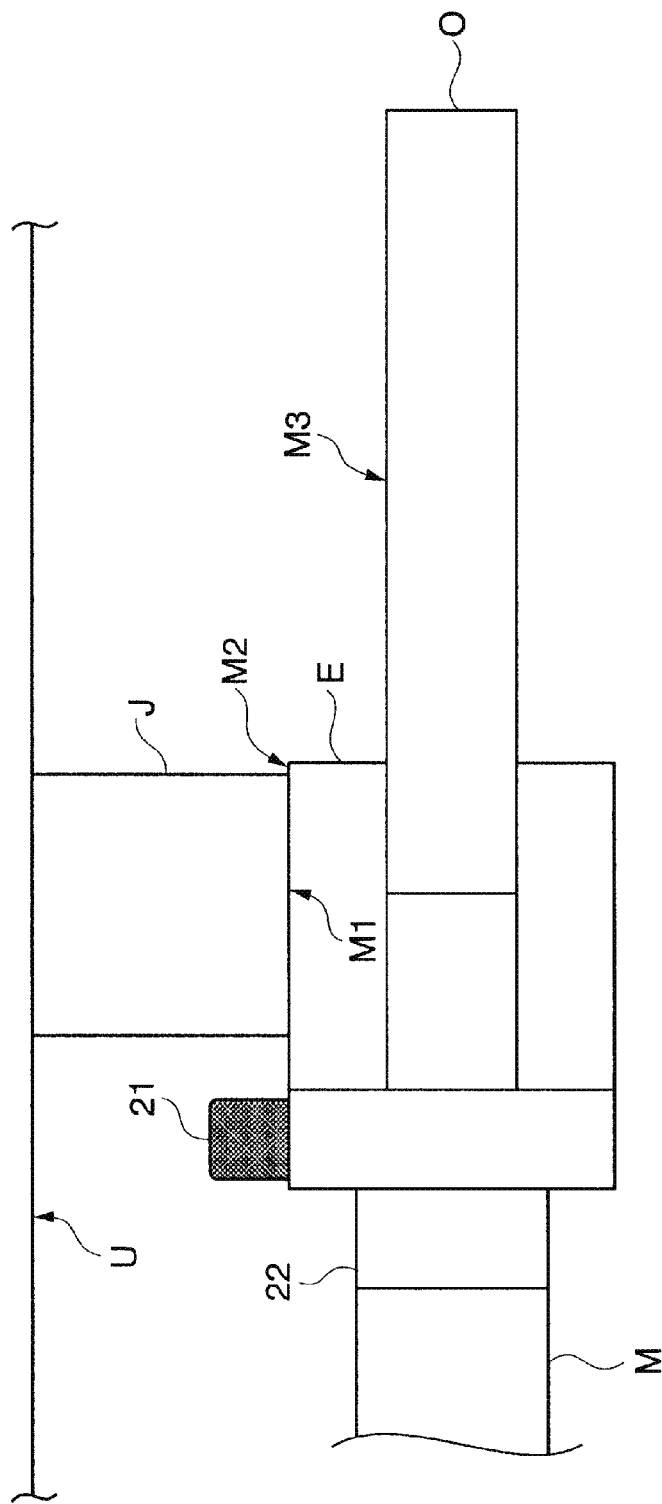
FIG. 8 is a diagram illustrating an example of a state immediately after the robot has caused the end effector grasping the object to come into surface contact with the reference surface.

As described above, the inclination adjustment step control unit 52 causes the robot 20 to perform the work of the inclination adjustment step. In place of the configuration in which the work surface M3 of the object O is caused to come into surface contact with the reference surface M1, as illustrated in FIG. 8, the inclination adjustment step control unit 52 may be configured to cause the hand surface M2 of the end effector E to come into surface contact with the reference surface M1. FIG. 8 is a diagram illustrating an example of a state immediately after the robot 20 has caused the end effector E grasping the object O to come into surface contact with the reference surface M1.

In this case, in a case where the hand surface M2 of the end effector E is caused to come into surface contact with the reference surface M1 such that the hand surface M2 thereof becomes horizontal with respect to the reference surface M1, the force detection unit 22 is adjusted in advance such that an output value of the force detection unit 22 included in the force detection information acquired from the force detection unit 22 satisfies predetermined surface contact conditions. Accordingly, the inclination adjustment step control unit 52 can cause the hand surface M2 of the end effector E to come into surface contact with the reference surface M1 such that the hand surface M2 thereof becomes horizontal with respect to the reference surface M1, based on the information indicating the three types of force and the information indicating the three types of moment included in the force detection information. After the hand surface M2 of the end effector E is caused to come into surface contact with the reference surface M1 such that the hand surface M2 thereof becomes horizontal with respect to the reference surface M1, the inclination adjustment step control unit 52 causes the inclination information acquiring unit 43 to acquire the inclination information from the first inclination measuring unit 21.

After the inclination adjustment step control unit 52 causes the robot 20 to perform the work of the inclination adjustment step, similar to a case where the inclination adjustment step control unit 52 determines that predetermined conditions are not satisfied in Step S125, the processing step control unit 54 causes the robot 20 to perform the work of the processing step in Step S140. In a case where any one or both of the conditions 2 and 3 among predetermined conditions are determined to be satisfied in Step S125, the inclination information acquiring unit 43 repeats the above-described processing in Step S130 as an example of remeasurement of the first angle.

Hereinafter, processing in Step S140 will be described. In Step S140, the processing step control unit 54 moves the end effector E, thereby moving the object O to a predetermined processing position based on the processing positional information included in the various types of positional information acquired in Step S100 such that the angle indicated in the inclination information acquired by the inclination information acquiring unit 43 in Step S130 does not change, while acquiring the inclination information from the inclination information acquiring unit 43. After the position of the object O moves to a predetermined processing position, the processing device control unit 44 emits the laser L to the processing device 40 for only a predetermined time period. The laser L is emitted to the work surface M3 of the object O for only a predetermined time period. The work surface M3 is processed with the laser L.

In a case where the inclination adjustment step control unit 52 determines that predetermined conditions are not satisfied in Step S125, the processing step control unit 54 performs processing in Step S140 by using the inclination information which has been used when emitting the laser L to the work surface M3 of the object O grasped by the end effector E before the object O which is currently grasped by the end effector E (the inclination information used in previous processing in Step S140).

After emission of the laser L from the processing device 40 ends in Step S140, the material removing step control unit 56 causes the robot 20 to perform the work of the material removing step (Step S150). More specifically, the material removing step control unit 56 removes the object O after the work surface M3 is processed with the laser L to the material removing region, based on the material removing positional information included in the various types of positional information acquired in Step S100.

In this manner, the control unit 36 causes the robot 20 to perform predetermined work. The determination made in Step S125 is determination for avoiding the work of the inclination adjustment step in Step S130 being performed every time the object O is processed. Therefore, the control unit 36 may be configured to omit Step S125 from the flow chart illustrated in FIG. 5 when the robot 20 is caused to perform predetermined work.

In the description above, the first inclination measuring unit 21 provided on the hand surface M2 may be configured to be provided on the work surface M3 of the object O. In this case, the first inclination measuring unit 21 may be connected to the control device 30 by radio so as to be able to communicate therewith.

In place of the configuration in which the inclination information is acquired from the first inclination measuring unit 21 in a state where the control device 30 causes the work surface M3 of the object O to come into surface contact with the reference surface M1 such that the work surface M3 thereof becomes horizontal with respect to the reference surface M1, the robot system 1 may have a configuration in which the inclination of the reference surface M1 is measured by the first inclination measuring unit 21 detached from the hand surface M2. In this case, the first inclination measuring unit 21 may be connected to the control device 30 through radio communication so as to be able to communicate therewith. After the first inclination measuring unit 21 is detached from the hand surface M2 and is installed on the reference surface M1, the control device 30 acquires the inclination information as second inclination information from the first inclination measuring unit 21 installed on the reference surface M1. Thereafter, the first inclination measuring unit 21 is detached from the reference surface M1 and is installed on the hand surface M2. The control device 30 acquires the inclination information as first inclination information from the first inclination measuring unit 21 installed on the hand surface M2. The control device 30 changes the posture of the end effector E such that the angle indicated in the acquired first inclination information coincides with the angle indicated in the acquired second inclination information. In this manner, the robot system 1 can obtain an effect similar to that of the robot system 1 of the above-described embodiment.

Modification Example 1 of Embodiment

Figure 9:
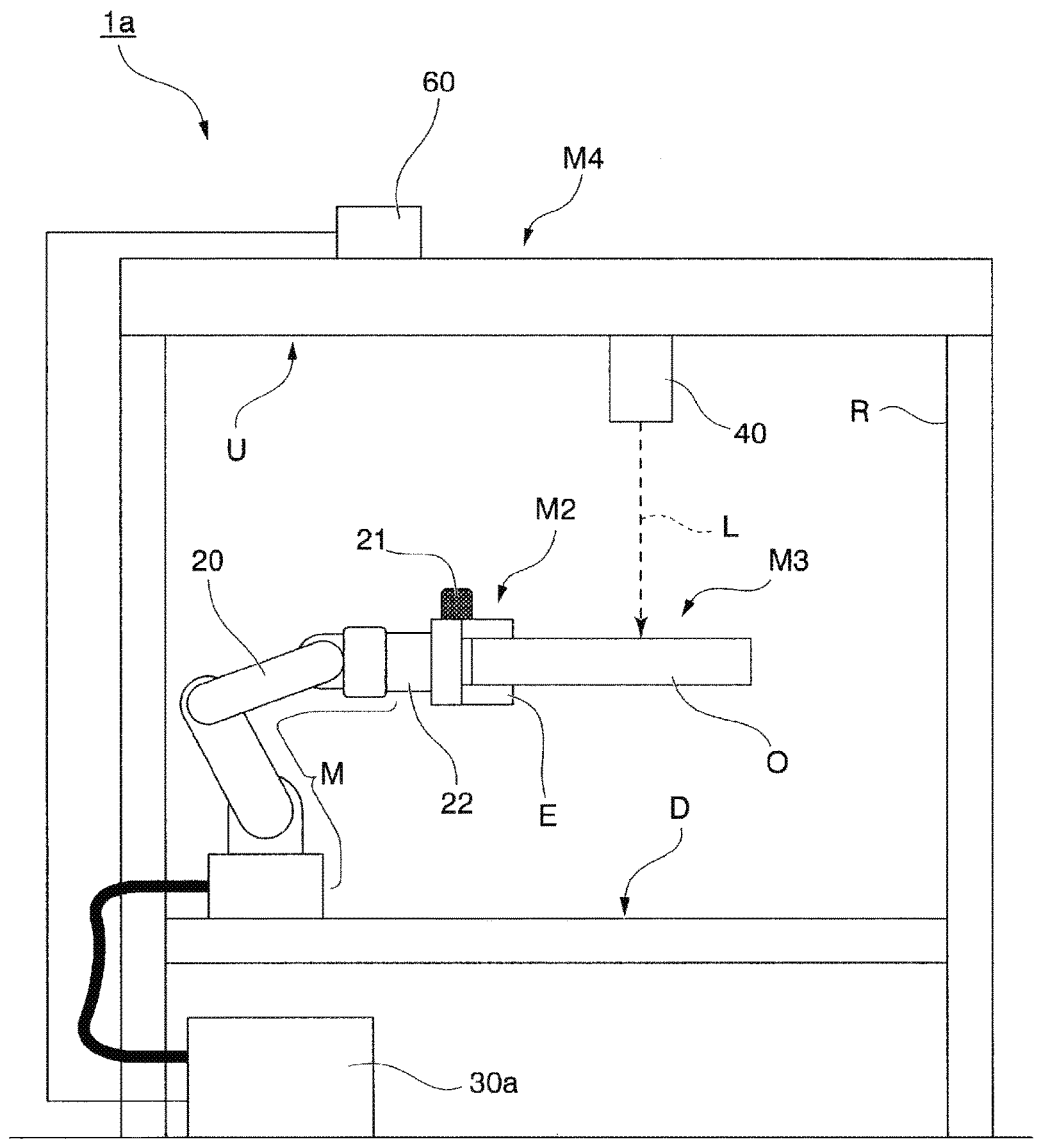
FIG. 9 is a configuration diagram illustrating an example of a robot system of Modification Example 1 of the present embodiment.

Hereinafter, with reference to FIGS. 9 to 11, Modification Example 1 of the embodiment of the invention will be described. In Modification Example 1 of the embodiment, the same reference signs will be applied to configuration units similar to those in the embodiment and the description thereof will be omitted. FIG. 9 is a configuration diagram illustrating an example of a robot system 1a of Modification Example 1 of the present embodiment. The robot system 1a includes the robot 20 and a control device 30a. In Modification Example 1 of the embodiment, being different from the above-described embodiment, the robot system 1a causes the inclination of the work surface M3 to be horizontal with respect to a surface of the ceiling of the processing chamber R illustrated in FIG. 9, that is, a reference surface M4 on the outer side of the processing chamber R in the inclination adjustment step, in place of the reference surface M1 which the jig J has. Therefore, as illustrated in FIG. 9, no jig J is provided inside the processing chamber R.

The reference surface M4 is provided with a second inclination measuring unit 60. The second inclination measuring unit 60 is a sensor which measures an inclination of the reference surface M4 with respect to the XY plane in the robot coordinate system. In place of the configuration of measuring an angle indicating the inclination of the reference surface M4 with respect to the XY plane, the second inclination measuring unit 60 may be configured to measure an angle indicating the inclination of the reference surface M4 with respect to a different surface. In this example, the inclination of the reference surface M4 is expressed by an angle indicating an inclination between the X-axis direction in the XY plane and the X-axis direction in the three-dimensional local coordinate system set on the hand surface, and an angle indicating an inclination between the Y-axis direction in the XY plane and the Y-axis direction in the three-dimensional local coordinate system set on the reference surface M4. The inclination of the reference surface M4 may be configured to be expressed by a different value.

The second inclination measuring unit 60 outputs the inclination information including the measured angles thereof as output values to the control device 30a through communication. One or more angles indicating the inclination of the reference surface M4 included in the inclination information are examples of the first angle. The second inclination measuring unit 60 is connected to the control device 30a through a cable so as to be able to communicate therewith. Cable communication via the cable is performed based on a standard of the Ethernet (registered trademark) or a USB, for example. The second inclination measuring unit 60 may be configured to be connected to the control device 30a through radio communication performed based on a communication standard of the Wi-Fi (registered trademark) or the like.

Figure 10:
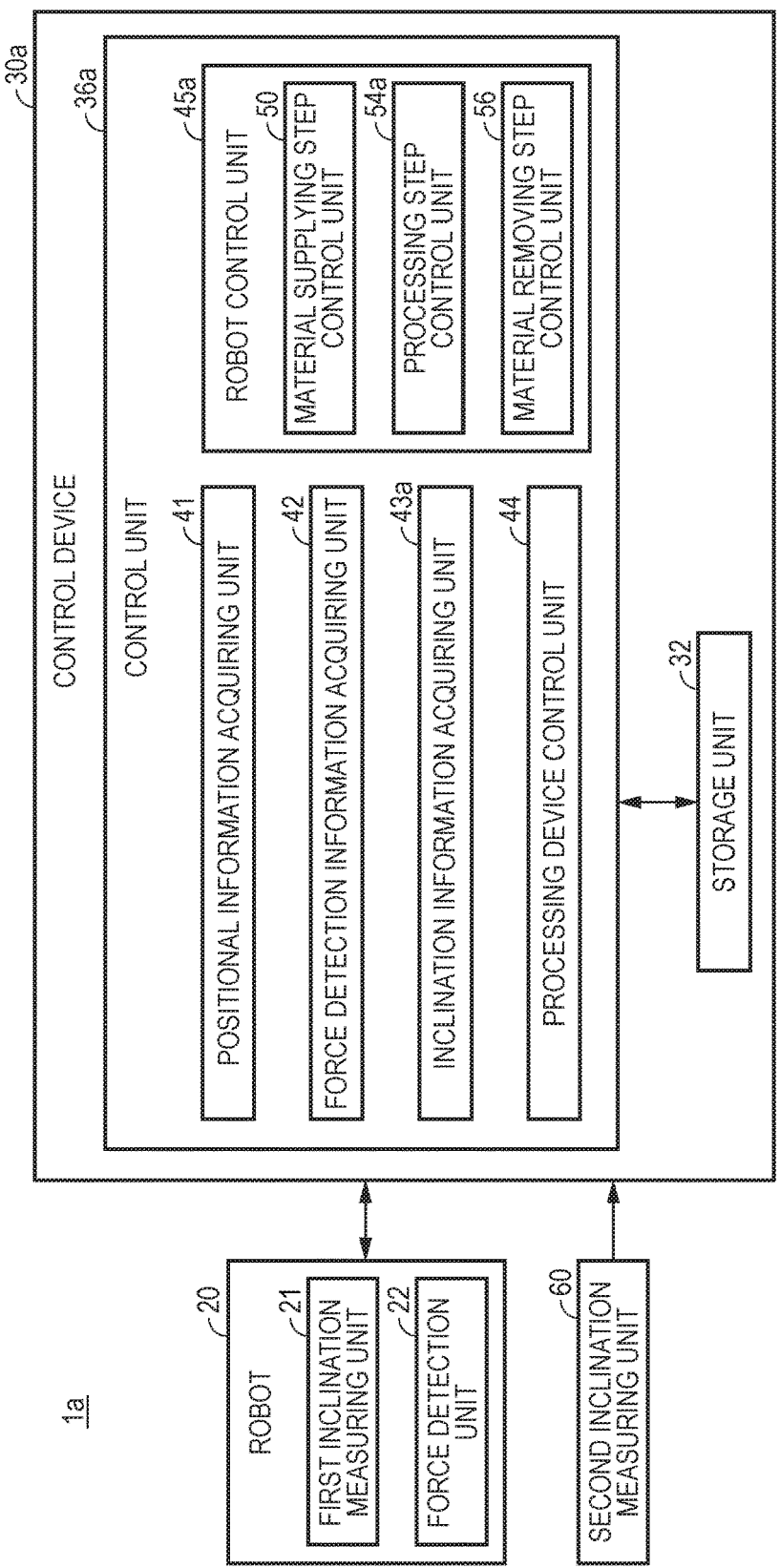
FIG. 10 is a diagram illustrating an example of a functional configuration of a control device. The control device includes a storage unit and a control unit.
Figure 11:
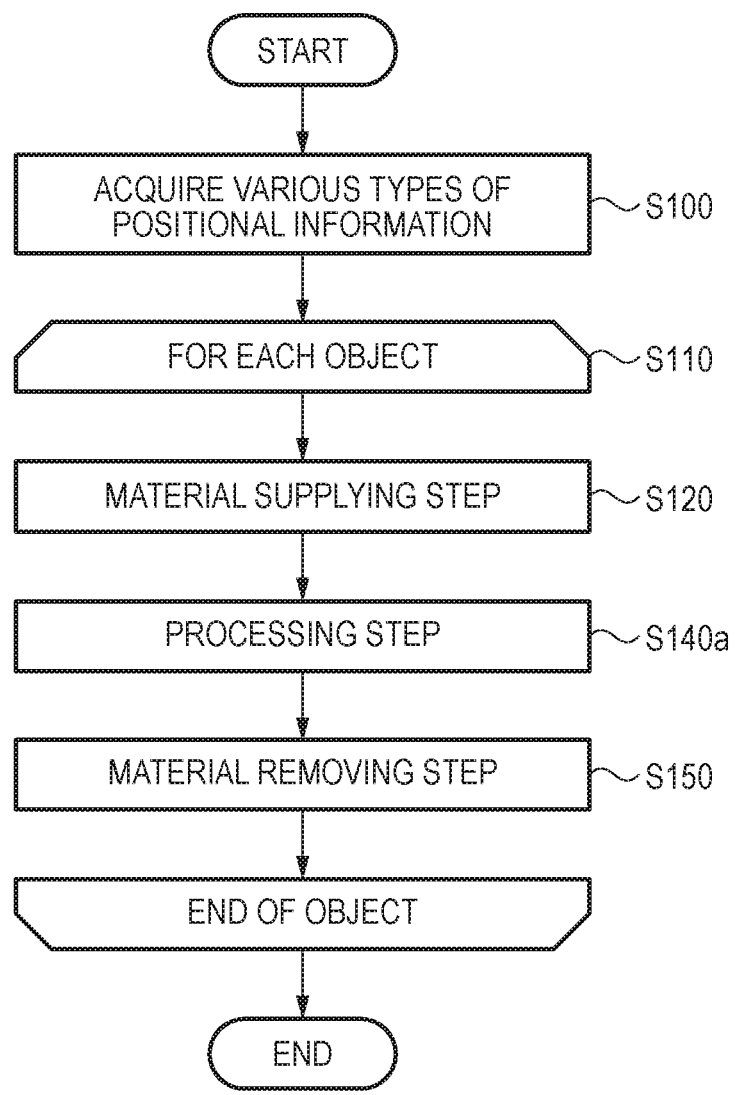
FIG. 11 is a flow chart illustrating an example of a flow of a process performed by the control unit.

FIG. 10 is a diagram illustrating an example of a functional configuration of the control device 30a. The control device 30a includes the storage unit 32 and a control unit 36a.

The control unit 36a includes the positional information acquiring unit 41, the force detection information acquiring unit 42, an inclination information acquiring unit 43a, the processing device control unit 44, and a robot control unit 45a.

The inclination information acquiring unit 43a acquires the inclination information as the first inclination information from the first inclination measuring unit 21. The inclination information acquiring unit 43a acquires the inclination information as the second inclination information from the second inclination measuring unit 60.

The robot control unit 45a includes the material supplying step control unit 50, a processing step control unit 54a, and the material removing step control unit 56.

The processing step control unit 54a causes the robot 20 to perform the work of the processing step based on the first inclination information acquired by the inclination information acquiring unit 43 from the first inclination measuring unit 21, and the second inclination information acquired by the inclination information acquiring unit 43 from the second inclination measuring unit 60.

Hereinafter, with reference to FIG. 11, processing performed by the control unit 36a will be described. FIG. 11 is a flow chart illustrating an example of a flow of a process performed by the control unit 36a. Processing in Steps S100, S110, S120, and S150 of the flow chart illustrated in FIG. 11 is processing similar to the processing in Steps S100, S110, S120, and S150 of the flow chart illustrated in FIG. 5. Thus, description thereof will be omitted.

After the work of the material supplying step is performed by the robot 20 in Step S120, the processing step control unit 54a causes the robot 20 to perform the work of the processing step of Modification Example 1 of the embodiment (Step S140a). More specifically, the processing step control unit 54a causes the inclination information acquiring unit 43 to acquire the second inclination information from the second inclination measuring unit 60.

The processing step control unit 54a changes the posture of the hand surface M2 of the end effector E such that the angle indicated in the first inclination information coincides with an angle which is the angle indicated in the second inclination information, that is, the hand surface M2 is caused to be horizontal with respect to the reference surface M4, while acquiring the first inclination information from the inclination information acquiring unit 43.

In this example, the work surface M3 in a case where the object O is grasped by the end effector E is horizontal with respect to the hand surface M2. Therefore, the processing step control unit 54a causes the hand surface M2 to be horizontal with respect to the reference surface M4, thereby causing the work surface M3 to be horizontal with respect to the reference surface M4. In a case where the work surface M3 in a case where the object O is grasped by the end effector E is not horizontal with respect to the hand surface M2, in Step S140a, the processing step control unit 54a changes the posture of the end effector E such that the work surface M3 becomes horizontal with respect to the reference surface M4, based on an angle indicating the inclination of the work surface M3 with respect to the hand surface M2, the angle indicated in the first inclination information, and the angle indicated in the second inclination information.

After the work surface M3 is caused to be horizontal with respect to the reference surface M4, the processing step control unit 54a moves the end effector E, thereby moving the object O to a predetermined processing position based on the processing positional information included in the various types of positional information acquired in Step S100 such that the posture of the hand surface M2 does not change, while acquiring the first inclination information from the inclination information acquiring unit 43. After the position of the object O moves to a predetermined processing position, the processing device control unit 44 emits the laser L to the processing device 40 for only a predetermined time period. The laser L is emitted to the work surface M3 of the object O for only a predetermined time period. The work surface M3 is processed with the laser L.

As described above, the control unit 36a causes the inclination of the work surface M3 to be horizontal with respect to the reference surface M4 based on the angle indicated in the first inclination information acquired by the inclination information acquiring unit 43 in the inclination adjustment step and the angle indicated in the second inclination information acquired by the inclination information acquiring unit 43, thereby causing the robot 20 to perform the work of the processing step. Accordingly, the robot system 1a can obtain an effect similar to that of the robot system 1 of the embodiment.

In Modification Example 1 of the embodiment, the first inclination measuring unit 21 provided on the hand surface M2 may be configured to be provided on the work surface M3 of the object O. In this case, the control unit 36a causes the inclination of the hand surface M2 to be horizontal with respect to the reference surface M4 based on the angle indicated in the first inclination information acquired by the inclination information acquiring unit 43 in the inclination adjustment step and the angle indicated in the second inclination information acquired by the inclination information acquiring unit 43.

In place of the configuration in which the inclination of the reference surface M4 is measured by the second inclination measuring unit 60, the robot system 1a may have a configuration in which the inclination of the reference surface M4 is measured by the first inclination measuring unit 21 detached from the hand surface M2. In this case, the first inclination measuring unit 21 may be connected to the control device 30 through radio communication so as to be able to communicate therewith. After the first inclination measuring unit 21 is detached from the hand surface M2 and is installed on the reference surface M4, the control device 30 acquires the inclination information as the second inclination information from the first inclination measuring unit 21 installed on the reference surface M4. Thereafter, the first inclination measuring unit 21 is detached from the reference surface M4 and is installed on the hand surface M2. The control device 30 acquires the inclination information as the first inclination information from the first inclination measuring unit 21 installed on the hand surface M2. The control device 30 changes the posture of the end effector E such that the angle indicated in the acquired first inclination information coincides with the angle indicated in the acquired second inclination information. In this manner, the robot system 1a can obtain an effect similar to that of the robot system 1 of the embodiment.

Modification Example 2 of Embodiment

Figure 12:
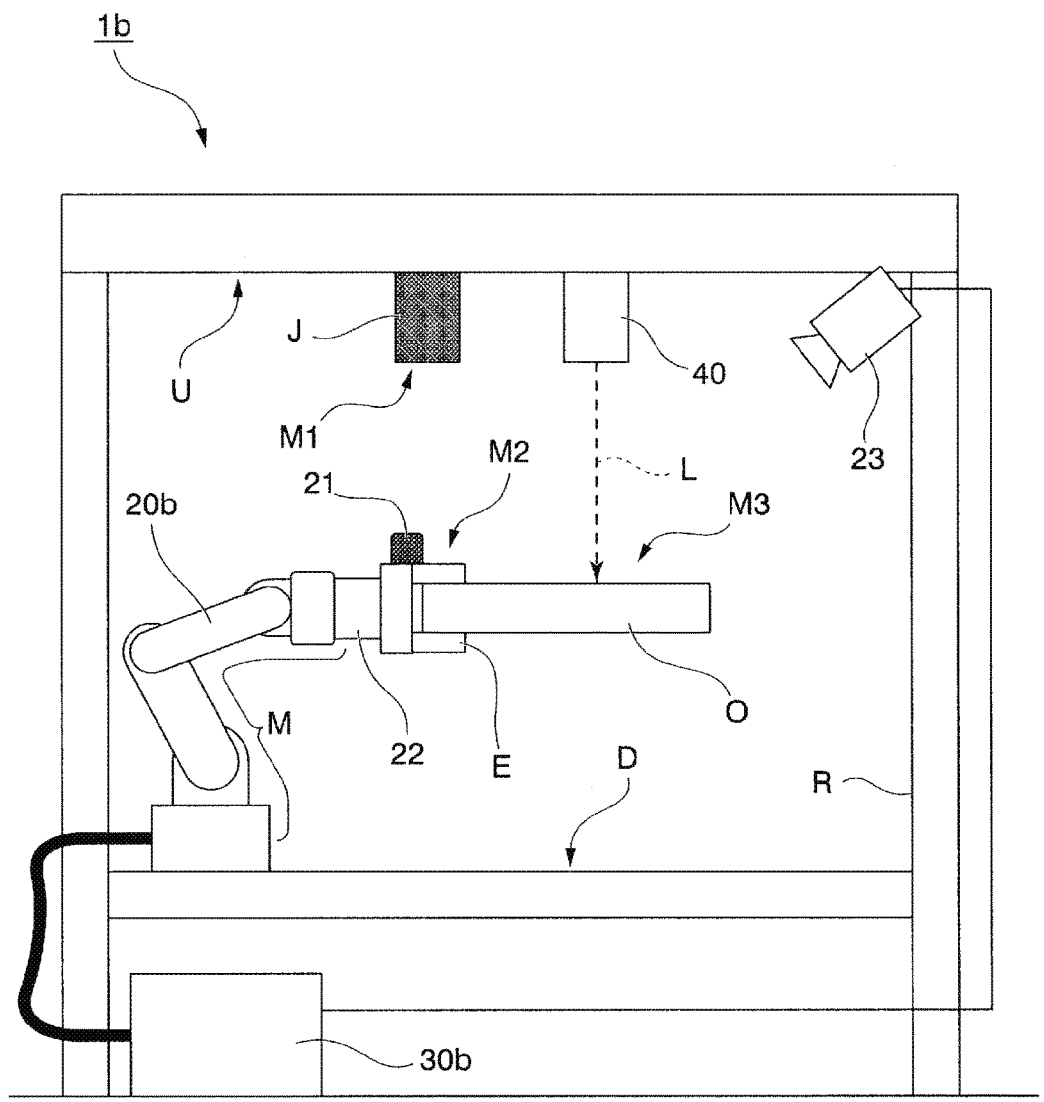
FIG. 12 is a configuration diagram illustrating an example of a robot system.

Hereinafter, with reference to FIGS. 12 to 14, Modification Example 2 of the embodiment of the invention will be described. In Modification Example 2 of the embodiment, the same reference signs will be applied to configuration units similar to those in the embodiment and the description thereof will be omitted. FIG. 12 is a configuration diagram illustrating an example of a robot system 1b. The robot system 1b includes a robot 20b and a control device 30b. In Modification Example 2 of the embodiment, similar to the above-described embodiment (being different from Modification Example 1 of the embodiment), the robot system 1b causes the inclination of the work surface M3 to be horizontal with respect to the reference surface M1 which the jig J has, in the inclination adjustment step. Meanwhile, the robot system 1b includes an image capturing unit 23 described below and detects a position of the end effector E and a position of the object O based on a captured image which is captured by the image capturing unit 23. The robot system 1b causes the robot 20b to perform the work of the material supplying step, the work of the inclination adjustment step, the work of the processing step, and the work of the material removing step based on the detected position of the end effector E and the detected position of the object O.

The robot 20b includes the first inclination measuring unit 21, the force detection unit 22, and the image capturing unit 23. The robot system 1 may be configured to include the image capturing unit 23 which is a body separated from the robot 20b. In FIG. 12, in order to simplify the illustration, the robot 20b and the work surface M3 are depicted as bodies separated from each other.

For example, the image capturing unit 23 is a stereo camera including a charge coupled device (CCD), a complementary metal oxide semiconductor (CMOS), or the like which is an imaging device converting concentrated light into an electrical signal. The image capturing unit 23 is connected to the control device 30 through a cable so as to be able to communicate therewith. Cable communication via the cable is performed based on a standard of the Ethernet (registered trademark) or a USB, for example. The image capturing unit 23 may be configured to be connected to the control device 30 through radio communication performed based on a communication standard of the Wi-Fi (registered trademark) or the like.

The image capturing unit 23 is installed at a position where a range including a region in which the end effector E is workable can be captured as an image capturing range. The image capturing unit 23 may be configured to perform stereoscopic image capturing of a still image of the image capturing range or may be configured to perform stereoscopic image capturing of a video image of the image capturing range.

Figure 13:
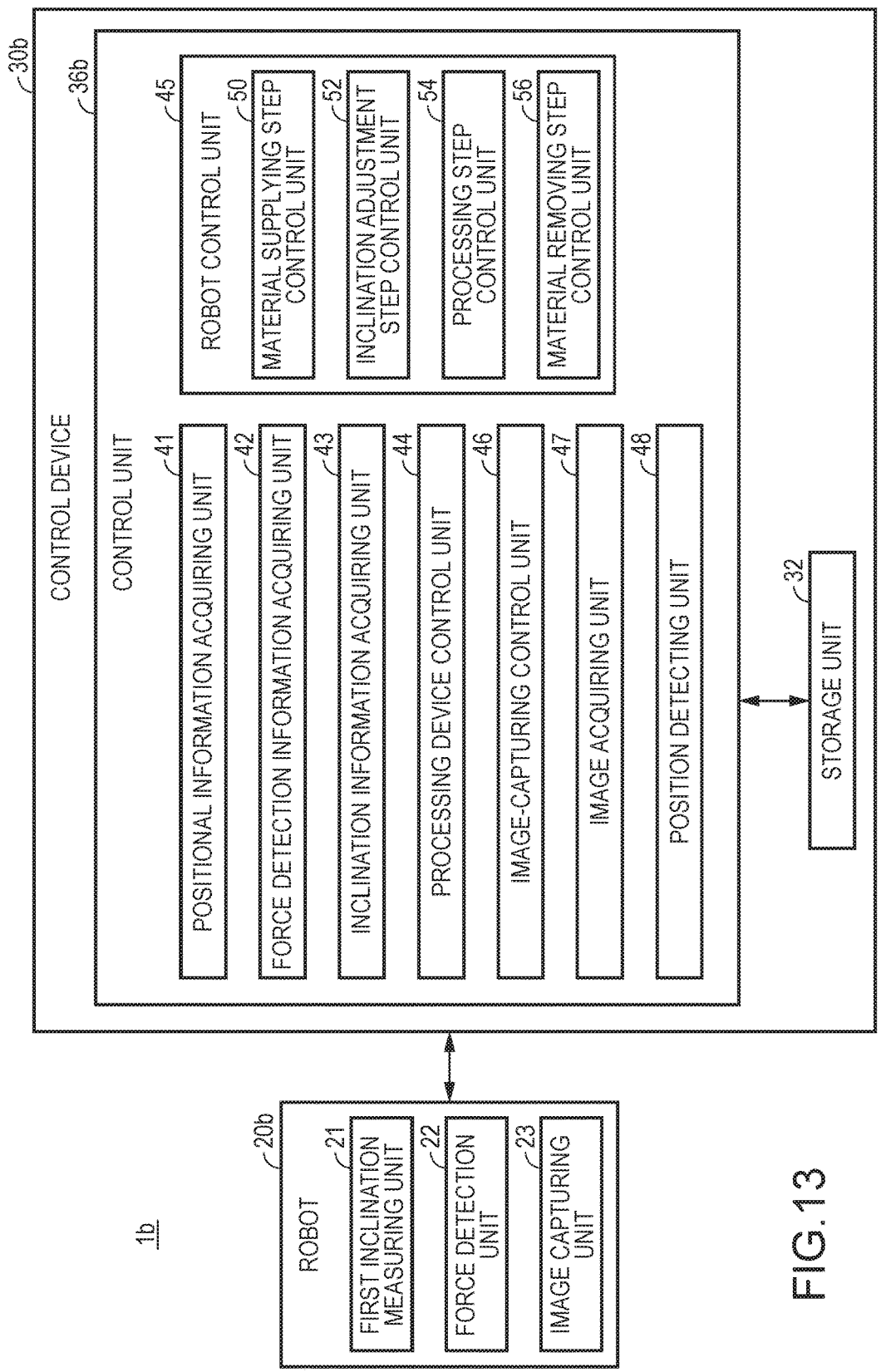
FIG. 13 is a diagram illustrating an example of a functional configuration of a control device. The control device includes the storage unit and a control unit.
Figure 14:
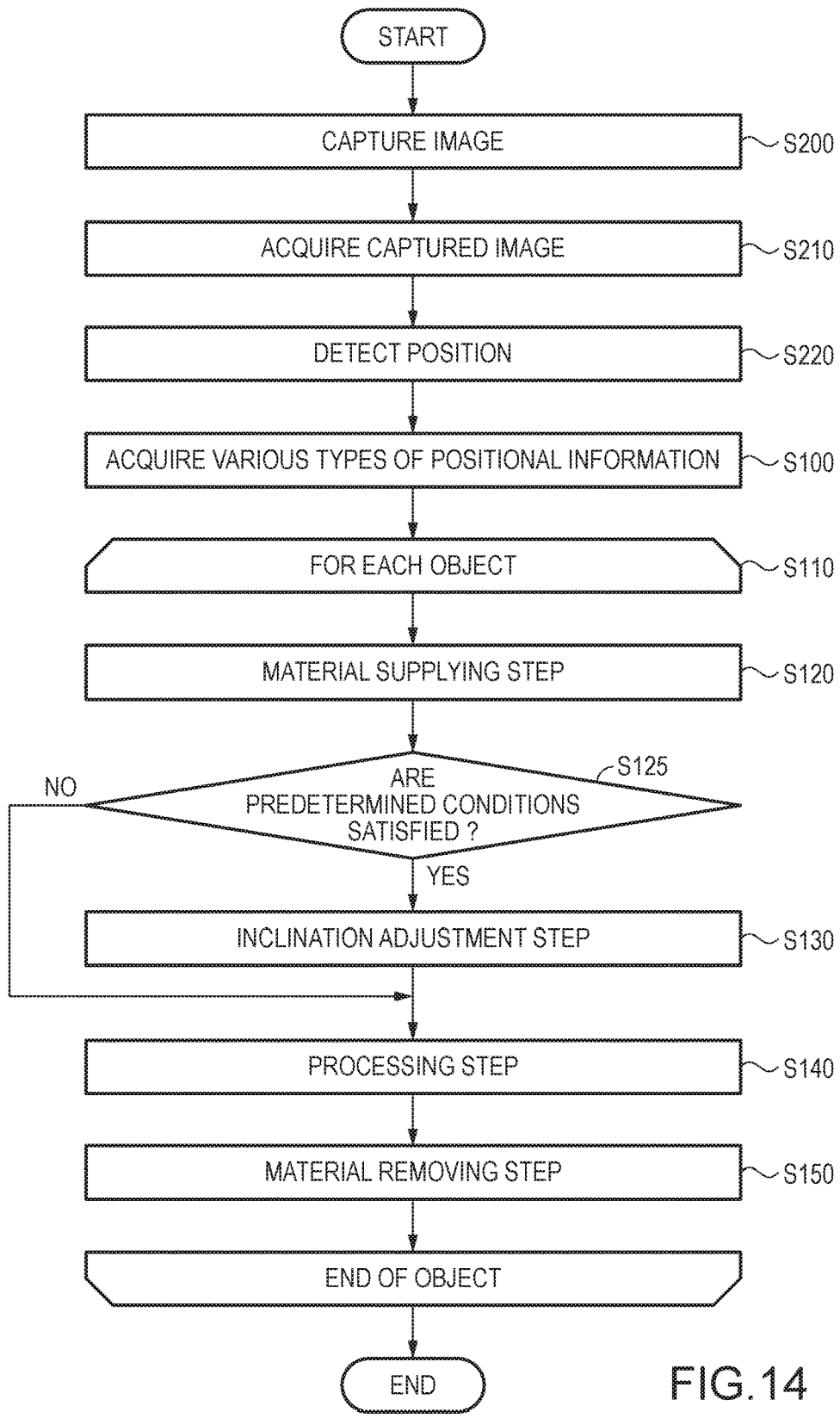
FIG. 14 is a flow chart illustrating an example of a flow of a process performed by the control unit.

FIG. 13 is a diagram illustrating an example of a functional configuration of the control device 30b. The control device 30b includes the storage unit 32 and a control unit 36b.

The control unit 36b includes the positional information acquiring unit 41, the force detection information acquiring unit 42, the inclination information acquiring unit 43, the processing device control unit 44, the robot control unit 45, an image-capturing control unit 46, an image acquiring unit 47, and a position detecting unit 48.

The image-capturing control unit 46 causes the image capturing unit 23 to perform stereoscopic image capturing of the image capturing range which can be captured by the image capturing unit 23.

The image acquiring unit 47 acquires the captured image which is captured by the image capturing unit 23, from the image capturing unit 23.

The position detecting unit 48 detects the position of the end effector E and the position of the object O based on the captured image acquired by the image acquiring unit 47.

Hereinafter, with reference to FIG. 14, processing performed by the control unit 36b will be described. FIG. 14 is a flow chart illustrating an example of a flow of a process performed by the control unit 36b. Processing in Steps S100 to S150 of the flow chart illustrated in FIG. 14 is processing similar to the processing in Steps S100 to S150 of the flow chart illustrated in FIG. 5. Thus, description thereof will be omitted.

The image-capturing control unit 46 causes the image capturing unit 23 to capture the image capturing range which can be captured by the image capturing unit 23 (Step S200). Subsequently, the image acquiring unit 47 acquires the captured image which is captured by the image capturing unit 23 in Step S200, from the image capturing unit 23 (Step S210). Subsequently, the position detecting unit 48 detects the position of the end effector E based on the captured image acquired by the image acquiring unit 47 in Step S210. The position detecting unit 48 detects the position of each of one or more objects O disposed in the material supplying region (not illustrated), based on the captured image (Step S220).

Here, processing in Step S220 will be described. In Modification Example 2 of the embodiment, the end effector E and each of one or more objects O are respectively provided with markers indicating the positions thereof. The position detecting unit 48 detects the marker from the captured image and detects the position indicated by the detected marker.

In this manner, in Modification Example 2 of the embodiment, the position of the end effector E and the position of each of one or more objects O are detected by the position detecting unit 48. Therefore, the various types of positional information may be configured not to include the above-described object positional information. In place of the configuration in which the end effector E and the position of each of one or more objects O are detected based on the captured image, the position detecting unit 48 may be configured to detect a portion or all of the end effector E, the position of each of one or more objects O, the position of the reference surface M1, the position of the material removing region (not illustrated), and a predetermined processing position. The position detecting unit 48 may be configured to detect the position of the end effector E and the position of each of one or more objects O through a different method such as pattern matching.

As described above, the control unit 36b detects the position of the end effector E and the position of each of one or more objects O from the captured image which is captured by the image capturing unit 23. The control unit 36b causes the robot 20b to perform the work of the material supplying step, the work of the inclination adjustment step, the work of the processing step, and the work of the material removing step based on the detected positions. Accordingly, the robot system 1b can obtain an effect similar to that of the robot system 1 of the embodiment.

In a case where the robot system 1b includes the image capturing unit 23 as that in Modification Example 2 of the embodiment, the control unit 36a may be configured to detect the deviation of a relative positional relationship between the end effector E and the object O when the object O is grasped by the end effector E grasps, based on the captured image acquired by the image acquiring unit 47. More specifically, the control unit 36a may be configured to detect that the work surface M3 of the object O is no longer horizontal with respect to the hand surface M2 of the end effector E when the object O is grasped by the end effector E, based on the captured image acquired by the image acquiring unit 47. In this case, the robot control unit 45a causes the end effector E to regrasp the object O, thereby causing the work surface M3 of the object O to be horizontal with respect to the hand surface M2 of the end effector E.

As described above, the robot system 1 (the robot system 1a, or the robot system 1b) causes the robot 20 (or the robot 20b) to perform the work of the processing step by using the inclination information acquired from the first inclination measuring unit 21 provided in the end effector E. Therefore, when the first inclination measuring unit 21 is provided in the end effector E, in a case where the positional relationship between the hand surface M2 of the end effector E and an inclinometer surface which is a surface on a side installed on the hand surface M2 of the first inclination measuring unit 21 deviates from a referential positional relationship, the robot system 1 (the robot system 1a, or the robot system 1b) needs to correct the inclination information acquired from the first inclination measuring unit 21 to the inclination information acquired in a case where the positional relationship between the hand surface M2 and the inclinometer surface is the referential positional relationship, when causing the robot 20 (or the robot 20b) to perform the work of the processing step. Hereinafter, processing of the correction will be described.

Figure 15:
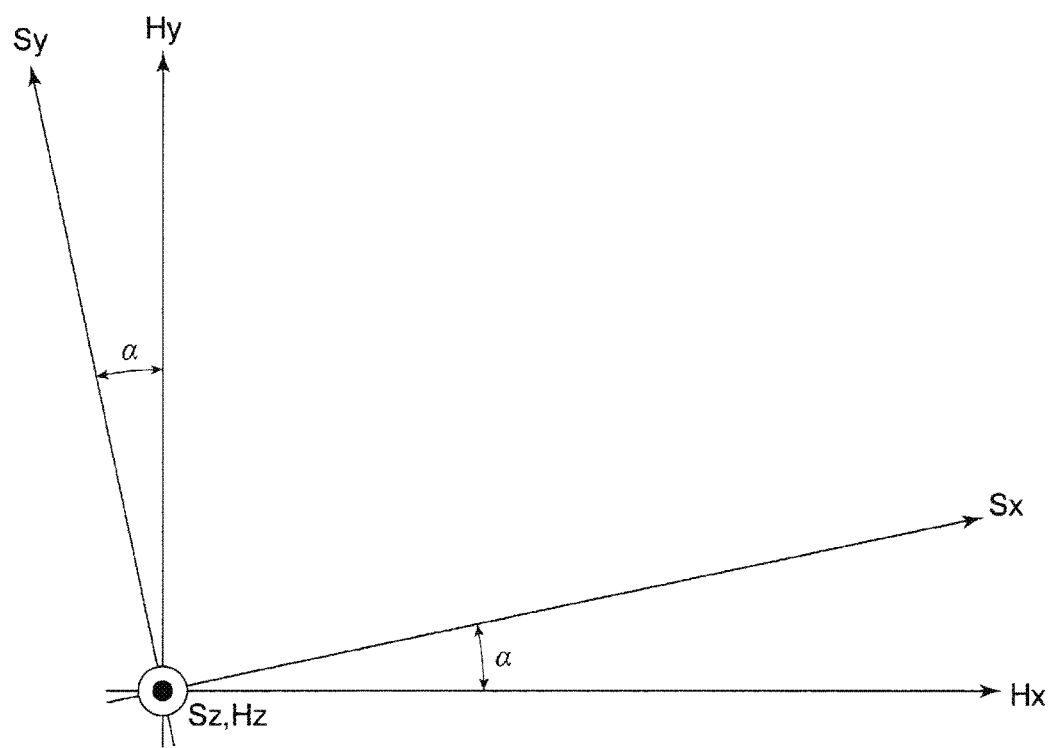
FIG. 15 is a diagram for describing a method of correcting inclination information in accordance with a positional relationship between a hand surface and an inclinometer surface.

Method of Correcting Inclination Information in accordance with Positional Relationship Between Hand Surface M2 and Surface of Inclinometer Hereinafter, with reference to FIG. 15, description will be given regarding a method of correcting the inclination information in accordance with the positional relationship between the hand surface M2 and the inclinometer surface. FIG. 15 is a diagram for describing a method of correcting the inclination information in accordance with the positional relationship between the hand surface M2 and the inclinometer surface. FIG. 15 illustrates three coordinate axes (X-axis Hx, Y-axis Hy, Z-axis Hz) in the local coordinate system indicating the posture of the hand surface M2, and three coordinate axes (X-axis Sx, Y-axis Sy, Z-axis Sz) in the local coordinate system indicating the posture of the inclinometer surface. The above-described referential positional relationship denotes a positional relationship between the hand surface M2 and the inclinometer surface in a case where the local coordinate system indicating the posture of the hand surface M2 coincides with the local coordinate system indicating the posture of the inclinometer surface. In the example illustrated in FIG. 15, the origins and the Z-axis directions in the local coordinate systems coincide with each other. However, in the above-referenced example, the X-axis directions and the Y-axis directions in the local coordinate systems deviate by an angle α. In other words, the example illustrated in FIG. 15 is an example of a case where the positional relationship between the hand surface M2 and the inclinometer surface deviates from the referential positional relationship.

In such a case, for example, the robot control unit 45 sets the X-axis direction in the local coordinate system indicating the current posture of the hand surface M2 as the reference (the zero point) of the inclination of the X-axis and sets the Y-axis direction in the local coordinate system as the reference (zero) of the inclination of the Y-axis. The robot control unit 45 rotates the end effector E about the X-axis in the local coordinate system indicating the posture of the hand surface M2 by an angle β. In this case, the inclination information acquired from the first inclination measuring unit 21 indicates the inclination of the inclinometer surface with respect to the XY plane in the robot coordinate system.

Therefore, the inclination information is corrected to the inclination of the hand surface M2 with respect to the XY plane in the robot coordinate system by applying Expressions (1) and (2) shown below. When the angle indicating the inclination of the Y-axis in the local coordinate system indicating the posture of the inclinometer surface with respect to the XY plane is an angle γ1, and the angle indicating the inclination of the X-axis in the local coordinate system with respect to the XY plane is an angle γ2, the relationships between the angle γ1 and the angle γ2, and the angle α and the angle β are expressed based on geometry as shown below in Expressions (1) and (2).

$$\sin(\gamma 1)=\cos(\alpha)\times\sin(\beta) \quad (1)$$

$$\sin(\gamma 2)=\cos(90°-\alpha)\times\sin(\beta)=\sin(\alpha)\times\sin(\beta) \quad (2)$$

The robot control unit 45 performs correction to the inclination of the hand surface M2 with respect to the XY plane in the robot coordinate system based on the expressions. In other words, the robot control unit 45 corrects the deviation of the hand surface M2 and the inclinometer surface from the referential positional relationship. Accordingly, the robot system 1 can easily install the first inclination measuring unit 21 with respect to the hand surface M2. The inclinometer surface is an example of a predetermined surface of the inclinometer.

As described above, the robot system 1 (the robot system 1a, or the robot system 1b) of the embodiment operates the arm based on the first angle (in this example, the angle indicating the inclination of the reference surface M1) of the reference surface (for example, the reference surface M1 or the reference surface M4) and the second angle (in this example, the angle indicating the inclination of the hand surface M2 or the angle of the work surface M3) measured by the first inclinometer. Accordingly, the robot system 1 can move the object (in this example, the object O) through an operation performed in accordance with the reference surface and the second angle.

The robot system 1 measures the first angle by using the first inclinometer (in this example, the first inclination measuring unit 21). Accordingly, the robot system 1 can move the object through an operation performed based on the first angle and the second angle measured by the first inclinometer, and the reference surface.

The robot system 1 measures the first angle by using the first inclinometer in a state where a predetermined surface of the object (in this example, the work surface M3) or a predetermined surface (in this example, the hand surface M2) of the grasping unit (in this example, the end effector E) is caused to come into surface contact with the reference surface. Accordingly, the robot system 1 can move the object through an operation performed based on the first angle and the second angle measured by the first inclinometer in a state where a predetermined surface of the object or a predetermined surface of the grasping unit is caused to come into surface contact with the reference surface.

The robot system 1 causes a predetermined surface of the object or a predetermined surface of the grasping unit to come into surface contact with the reference surface based on an output (in this example, the force detection information) of the force detector (in this example, the force detection unit 22). Accordingly, the robot system 1 can move the object by utilizing a state where a predetermined surface of the object or a predetermined surface of the grasping unit is caused to come into surface contact with the reference surface based on the output of the force detector.

The robot system 1a measures the first angle by using a second inclinometer which is different from the first inclinometer (in this example, the second inclination measuring unit 60). Accordingly, the robot system 1a can move the object through an operation performed in accordance with the reference surface, based on the first angle measured by the second inclinometer and the second angle measured by the first inclinometer.

The robot system 1 moves at least a portion of the arm (in this example, the end effector E) horizontally with respect to the reference surface. Accordingly, the robot system 1 can move the object horizontally with respect to the reference surface.

The robot system 1 operates the arm based on the first angle measured by utilizing the reference surface, and the second angle measured by the first inclinometer provided in the workpiece (in this example, the object O) processed by the processing device (in this example, the processing device 40) or the grasping unit. Accordingly, the robot system 1 can move the workpiece processed by the processing device, through an operation performed in accordance with the reference surface.

The robot system 1b changes the positional relationship between the grasping unit and the object based on a captured image which is captured by the image capturing unit (in this example, the image capturing unit 23). Accordingly, even in a case where the positional relationship between the grasping unit and the object has deviated, the robot system 1b can restore the positional relationship to that before the deviation.

The robot system 1 remeasures the first angle in a case where predetermined conditions are satisfied. Accordingly, the robot system 1 can remeasure the first angle in a case where there is a high possibility that the first angle has deviated.

The robot system 1 corrects the deviations of a predetermined surface of the objector a predetermined surface of the grasping unit and a predetermined surface of the first inclinometer from the referential positional relationship. Accordingly, the robot system 1 can move the object through an operation performed in accordance with the reference surface, based on the corrected positional relationship.

Hereinbefore, the embodiment of the invention has been described in detail with reference to the drawings. However, the specific configuration is not limited to the embodiment and may be changed, replaced, deleted, or the like without departing from the gist of the invention.

A program realizing a function of an arbitrary configuration unit in the above-described device (for example, the control device 30) may be recorded in a computer readable recording medium, and the program may be read by a computer system and may be executed. The aforementioned term "computer system" includes an operating system (OS) and hard ware such as peripheral equipment. The term "computer readable recording medium" denotes a portable medium such as a flexible disk, a magneto-optical disk, a ROM, and a compact disk ROM (CD-ROM) or a storage device such as a hard disk built in the computer system. Moreover, the term "computer readable recording medium" also includes a medium which retains the program for a certain period of time, such as a volatile memory (RAM) inside the computer system serving as a server or a client in a case where the program is transmitted via a network such as the internet or a communication channel such as a telephone line.

The above-described program may be transmitted to a different computer system from the computer system storing the program in the storage device or the like via a transmission medium, or through transmission waves in the transmission medium. Here, "the transmission medium" transmitting the program denotes a medium having the function of transmitting information, for example, a network (communication network) such as the internet, and a communication channel (communication line) such as a telephone line.

The above-described program may be a program realizing a portion of the above-described functions. Moreover, the above-described program may be a program which can be realized by combining the above-described functions with the program which has already been recorded in the computer system, that is, a so-called differential file (differential program).

The entire disclosure of Japanese Patent Application No. 2015-170162, filed Aug. 31, 2015 is expressly incorporated by reference herein.

What is claimed is:

1. A robot disposed within a processing chamber having a ceiling surface including a jig, the robot comprising:
   an arm having an end effector configured to grasp an object;
   a first inclinometer provided on a surface of the end effector or on the object grasped by the end effector;
   a controller configured to operate the arm based on a first angle of a reference surface of the jig relative to a plane in the robot coordinate system and a second angle of a predetermined surface of the end effector relative to the plane in the robot coordinate system; and
   a laser processing device provided on the ceiling surface, parallel to the reference surface,
   wherein the object is a workpiece and the laser processing device is configured to emit a laser onto the workpiece to surface process the workpiece, and
   wherein the first inclinometer is configured to measure the second angle.

2. The robot according to claim 1,
   wherein the first inclinometer is configured to measure the first angle.

3. The robot according to claim 1,
   wherein the first inclinometer is configured to measure the first angle in a state where a predetermined surface of the object or a predetermined surface of the grasping unit is caused to come into surface contact with the reference surface.

4. The robot according to claim 3,
wherein the arm includes a force detector which detects force acting on the end effector or an object grasped by the end effector, and
wherein the controller is configured to control the arm such that the predetermined surface of the object or the predetermined surface of the end effector comes into surface contact with the reference surface based on an output of the force detector.

5. The robot according to claim 1, further comprising:
a second inclinometer that measures the first angle, the second inclinometer being different from the first inclinometer.

6. The robot according to claim 1,
wherein the controller is configured to move at least a portion of the arm horizontally with respect to the reference surface.

7. The robot according to claim 1, further comprising:
an image capturing unit,
wherein the controller is configured to change a positional relationship between the end effector and the object based on a captured image captured by the image capturing unit.

8. The robot according to claim 1,
wherein the first inclinometer is configured to re-measure the first angle when a predetermined time period has elapsed or when a work surface of the object grasped by the end effector comes into surface contact with the reference surface.

9. The robot according to claim 1,
wherein the controller is configured to operate the arm based on the first angle and the second angle to correct deviations of a predetermined surface of the object or a predetermined surface of the grasping unit and a predetermined surface of the first inclinometer from a referential positional relationship.

10. A method for controlling a robot within a robot coordinate system having an arm and an end effector, the method comprising:
measuring, by a first inclinometer provided on a surface of the end effector or on an object grasped by the end effector, a first angle of a reference surface with respect to a plane in the robot coordinate system;
measuring, by the first inclinometer, a second angle of a predetermined surface of the end effector with respect to the plane in the robot coordinate system,
emitting, by a laser processing device, a laser onto a workpiece grasped by the end effector to surface process the workpiece,
wherein the laser is emitted from the laser processing device and is provided on a surface parallel to the reference surface; and
operating, by a controller, the arm based on the first angle and the second angle.

11. The method according to claim 10, wherein the first inclinometer is provided on a surface of the end effector.

12. The method according to claim 10, wherein the first inclinometer is provided on a surface of an object grasped by the end effector.

13. The method according to claim 10, further comprising:
moving, by the controller, a predetermined surface of the object or the predetermined surface of the end effector into surface contact with the reference surface, and
measuring, by the first inclinometer, the first angle.

14. The method according to claim 10, further comprising:
detecting, by a force detector, a force acting on the end effector or an object grasped by the end effector; and
moving, by the controller, the arm such that a predetermined surface of the object or a predetermined surface of the grasping unit comes into surface contact with the reference surface based on an output of the force detector.

15. The robot according to claim 10, further comprising:
re-measuring, by the first inclinometer, the first angle if a predetermined time period has elapsed or if a work surface of the object grasped by the end effector comes into surface contact with the reference surface.

16. The robot according to claim 10, further comprising:
measuring, by the first inclinometer, the first angle of the reference surface with respect to a work surface of the object grasped by the end effector;
measuring, by the first inclinometer, the second angle of the predetermined surface of the end effector with respect to the work surface.

17. The robot according to claim 10, further comprising:
correcting, by the controller, deviations of a predetermined surface of the object or a predetermined surface of the grasping unit and a predetermined surface of the first inclinometer from a referential positional relationship by operating, by the controller, the arm based on the first angle and the second angle.

* * * * *